US012572969B2

(12) United States Patent
Barbour et al.

(10) Patent No.: US 12,572,969 B2
(45) Date of Patent: Mar. 10, 2026

(54) METHOD, MEDIUM, AND SYSTEM FOR SURFACING RECOMMENDATIONS

(71) Applicant: Q2 SOFTWARE, INC., Austin, TX (US)

(72) Inventors: Jesse Lee Barbour, West Lake Hills, TX (US); Adam David Anderson, Austin, TX (US); Benjamin Ray Webster, Jacksonville, FL (US); Kristi Lynn Voll, Cedar Park, TX (US); Stephen John Zabel, Austin, TX (US)

(73) Assignee: Q2 Software, Inc., Austin, TX (US)

( * ) Notice: Subject to any disclaimer, the term of this patent is extended or adjusted under 35 U.S.C. 154(b) by 585 days.

(21) Appl. No.: 17/951,222

(22) Filed: Sep. 23, 2022

(65) Prior Publication Data

US 2023/0031926 A1 Feb. 2, 2023

Related U.S. Application Data

(63) Continuation of application No. 16/506,365, filed on Jul. 9, 2019, now Pat. No. 11,488,225, which is a (Continued)

(51) Int. Cl.
*G06Q 30/00* (2023.01)
*G06F 16/36* (2019.01)
(Continued)

(52) U.S. Cl.
CPC ....... *G06Q 30/0631* (2013.01); *G06F 16/367* (2019.01); *G06F 16/9535* (2019.01); *G06Q 30/0201* (2013.01)

(58) Field of Classification Search
CPC ........... G06Q 30/0631; G06Q 30/0201; G06Q 30/02011; G06Q 30/020112;

(Continued)

(56) References Cited

U.S. PATENT DOCUMENTS

| | | | | |
|---|---|---|---|---|
| 5,930,764 A | * | 7/1999 | Melchione | ............. G06Q 30/02 705/7.29 |
| 7,370,004 B1 | * | 5/2008 | Patel | ...................... G06Q 30/02 705/14.39 |

(Continued)

FOREIGN PATENT DOCUMENTS

KR 20100067764 A * 6/2010 ............. G16B 50/00

OTHER PUBLICATIONS

Musto, Cataldo, et al. "Financial product recommendation through case-based reasoning and diversification techniques." RecSys Posters. 2014. (Year: 2014).*

*Primary Examiner* — Matthew E Zimmerman
(74) *Attorney, Agent, or Firm* — Sprinkle IP Law Group

(57) ABSTRACT

Embodiments of a system as described herein may receive financial institution product information from a plurality of financial institutions distributed across a computing network. The system may also receive data from the plurality of financial institutions distributed across the computer network and create or update an ontology. A relevance score may be generated for a set of financial institution products which may, in conjunction with a campaign definition provided by a financial institution administrator, be used to associate users with a list of campaigns which may be stored as campaign data. An online banking application at a user device may request campaign data for a user. In response, the system may return campaign data for the user to the online banking application. Using the campaign data, the online banking application may select one or more products to recommend to the user and display content for the selected products on the user device.

20 Claims, 9 Drawing Sheets

Related U.S. Application Data continuation of application No. 15/241,907, filed on Aug. 19, 2016, now Pat. No. 10,387,939.

(60) Provisional application No. 62/208,061, filed on Aug. 21, 2015.

(51) Int. Cl.
  *G06F 16/9535* (2019.01)
  *G06Q 30/0201* (2023.01)
  *G06Q 30/0601* (2023.01)

(58) Field of Classification Search
  CPC ..... G06Q 30/02012; G06Q 30/020121; G06Q 30/020122; G06Q 30/02013; G06Q 30/02014; G06Q 30/020141; G06Q 30/02015; G06Q 30/02016; G06Q 30/02017; G06Q 30/02018; G06Q 30/06311; G06Q 30/06312; G06Q 30/06313; G06Q 30/06314; G06Q 30/06315; G06F 16/367; G06F 16/9535
  See application file for complete search history.

(56) References Cited

U.S. PATENT DOCUMENTS

| | | | |
|---|---|---|---|
| 2003/0135442 A1* | 7/2003 | Kumar ................... | G06Q 40/04 |
| | | | 705/37 |
| 2009/0276368 A1* | 11/2009 | Martin ................... | G06Q 40/02 |
| | | | 705/36 R |
| 2010/0106568 A1* | 4/2010 | Grimes ............. | G06Q 30/0213 |
| | | | 705/14.1 |
| 2010/0106598 A1* | 4/2010 | Grimes ............. | G06Q 30/0269 |
| | | | 705/14.53 |
| 2014/0180868 A1* | 6/2014 | Kanigsberg ........ | G06Q 30/0269 |
| | | | 705/26.7 |
| 2015/0220999 A1* | 8/2015 | Thornton ............ | H04M 15/805 |
| | | | 705/14.66 |

* cited by examiner

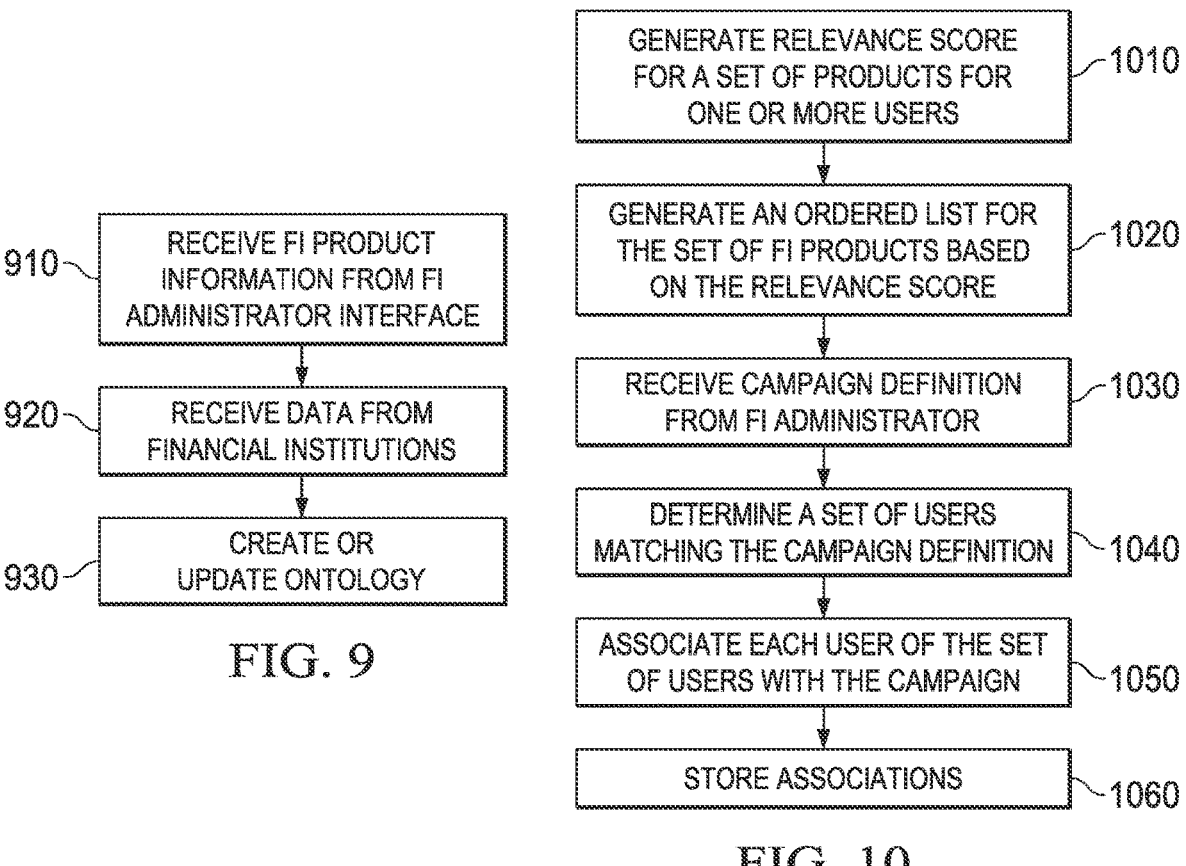
FIG. 9
FIG. 10
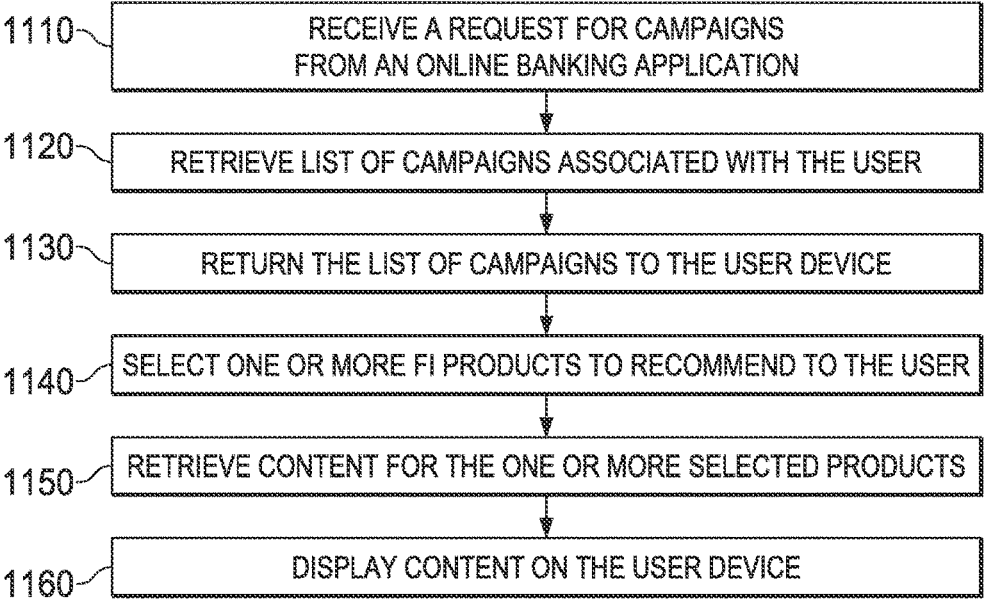
FIG. 11

METHOD, MEDIUM, AND SYSTEM FOR SURFACING RECOMMENDATIONS

CROSS-REFERENCE TO RELATED APPLICATION(S)

This application is a continuation of and claims a benefit of priority under 35 U.S.C. § 120 from, U.S. patent application Ser. No. 16/506,365 filed Jul. 9, 2019, issued as U.S. Pat. No. 11,488,225, entitled "Method, Medium, and System for Surfacing Recommendations," which is a continuation of and claims a benefit of priority under 35 U.S.C. § 120 from, U.S. patent application Ser. No. 15/241,907 filed Aug. 19, 2016, issued as U.S. Pat. No. 10,387,939, entitled "Method, Medium, and System for Surfacing Recommendations," which claims a benefit of priority under 35 U.S.C. § 119(e) from U.S. Provisional Patent Application No. 62/208,061 filed Aug. 21, 2015, entitled "Method and System for Surfacing Recommendations for Products Offered by a Specific Entity Utilizing a Knowledge Base Created from Data Aggregated from Multiple Entities in a Distributed Network Environment," all of which are fully incorporated by reference herein.

TECHNICAL FIELD

This disclosure relates generally to recommending products of a specific entity, such as a financial institution, in a distributed networked environment that includes multiple entities and participants using a knowledge base created and updated using data collected from the multiple entities (or other sources) in the distributed network environment. In particular, this disclosure relates to use of a knowledge base that serves to normalize or equate similar product offerings across the multiple entities and to relate other data, including data associated with participants in the network, entities of the network, the product offerings, or other data. Even more specifically, this disclosure relates to use of a knowledge base to provide recommendations for a specific entity to be presented to a specific participant based both on that specific participant and entity and data of other participants and entities, despite that the specific participant and entity may have no visibility into data associated with the other entities or participants.

BACKGROUND

Almost universally today entities such as financial institutions or the like (collectively financial institutions herein) offer some sort of online presence (e.g., web site, mobile application, etc.) by which users can conduct transactions or other activities with the financial institution through a distributed network. Moreover each entity may conduct transactions or other activities (collectively transactions) associated with that user through that same distributed network. For example, the resolution of a user's credit card purchase with an affiliated credit or payment network may be conducted through the same distributed network.

In many instances, however, data processing platforms utilized by financial institutions or other entities to manage or otherwise process user accounts and associated information of transactions pertaining to these accounts have been developed over a number of years and may have a correspondingly long lifespan. These data processing systems may offer a certain range of functionality, however, in many cases these legacy systems are incompatible with one another. Consequently, at present, financial institutions are not easily or directly able to view data or conduct transactions between themselves, as different financial institutions may utilize different types of data processing platforms. This limitation may severely limit the value financial institutions can create for their customers and may adversely impact their own operating efficiencies as well. More specifically these limitations may prevent or hinder the ability of a financial institution to conduct transactions (e.g., viewing account information, moving funds between accounts, withdrawing or transferring funds from an account, etc.) in conjunction with other financial institutions or to implement an online presence.

For these reasons, among others, in many cases an entity's online presence may be implemented or managed from a distinct system where, for example, that distinct system may be implemented or facilitated by a third party provider. In fact, these distinct systems may provide functionality related to the online presence of multiple distinct entities, including for example, the collection and presentation of data associated with a user, including accounts, account activity, the generation and presentation of interfaces for presenting such information to the user, etc.

In conjunction with the use of such an online presence by a user, an opportunity is presented to a financial institution to recommend a product offering of that entity to the user through such an online presence. Specifically, the various entities, including financial institutions, usually have a wide variety of products on offer. These products, include for example, savings accounts, (e.g., retail, commercial, HSA accounts, etc.), credit products (e.g., credit cards), prime deposit products, loans, accounts (e.g., various types of checking accounts, etc.) or other products. It is often difficult to know which particular product of a financial institution to recommend to a user, as data on the user, the financial products offered by the institution or other data may be scarce. For example, even that particular user may have their limited number of accounts or services spread out over multiple financial institutions.

This fact, however, has not diminished the desire of these financial institutions to recommend their products to users interacting through with their online presence. Additionally, it is also desired to improve the quality of recommendations that are made to the users, for a variety of reasons, not the least of which it to increase uptake of the recommendations by the user.

SUMMARY

This disclosure relates generally to recommending products of a specific entity, such as a financial institution, in a distributed networked environment that includes multiple entities and participants using a knowledge base created and updated using data collected from the multiple entities (or other sources) in the distributed network environment. The knowledge base may serve to normalize or equate similar product offerings across the multiple entities and to relate other data, including data associated with participants in the network, entities of the network, the product offerings, or other data. The knowledge base thus allows recommendations for a specific entity to be presented to a specific participant based both on that specific participant and entity and data of other participants and entities, despite that the specific participant and entity may have no visibility into data associated with the other entities or participants.

To these ends, a system as disclosed herein may comprise an online presence system communicatively connected to a user device and a plurality of financial institutions (FIs) over a network. The online presence system may receive financial institution product information and raw data from the plurality of financial institutions. The financial institution product information may be received from a FI administrator at a FI administrator interface communicatively connected to the online presence system over a network. The raw data may include user data, financial institution data, and financial institution product data. Based on the received financial institution product information and the raw data received from the plurality of financial institutions, the system may create an ontology. The ontology may comprise a user ontology comprising a plurality of nodes representing users across the plurality of financial institutions and behavioral data for the users, a financial institution ontology comprising a plurality of nodes representing the plurality of financial institutions, and a financial institution product ontology comprising a plurality of nodes representing classes of financial institution products, subclasses of financial institution products, and specific products of the financial institutions. A relevance score may be generated for each financial institution product of a set financial institution products for a financial institution associated with a user. The relevance score may be generated using a collaborative filtering process. Based on the relevance score, campaign data may be generated for the user and stored in a cache. The campaign data may be generated by sorting the set of financial institution products for the user according to the relevance score to form an ordered list.

Additionally, the system may receive a campaign definition from an FI administrator via an FI administrator interface, the campaign definition including a set of traits. A set of users matching the campaign definition may be determined based on the set of traits, which may, in addition to the relevance score, be used to generate the campaign data.

The system may receive a request for campaign data for the user from an online banking application running on the user device and return the campaign data for the user to the online banking application running on the user device. The online banking application may select one or more financial products from the campaign data to be recommended to the user, retrieve content for the selected one or more financial products from a content store, and present the content to the user via the user device.

Embodiments disclosed herein may also provide methods of providing recommendations, the methods including steps substantially similar to those performed by the system above.

Embodiments disclosed herein can provide numerous advantages. By creating an ontology of user data and financial institution data across multiple financial institutions, a set of top scored financial products can be determined for each user and stored until needed. The top scored financial products can be retrieved and displayed to a user upon the user accessing an online banking application rather than having to be calculated at runtime.

By accessing data across a number of users and a number of financial institutions, typical user behavior can be analyzed and similar financial products can be equated. Data can be obtained from disparate financial institutions even if the financial institutions have different systems and data structures for storing such data. Thus, financial institutions may be able to offer better product recommendations to users, for example, by recommending products which the user does not currently have but is most likely to purchase. Better product recommendations may translate into higher uptake of the recommended products, resulting in increased revenue for the financial institutions.

Other embodiments are also possible. For example, one embodiment comprises a computer program product. The computer program product may comprise at least one non-transitory computer readable medium storing instructions translatable by at least one processor to implement steps associated with an online presence system as disclosed herein. Another embodiment of the computer program product may comprise at least one non-transitory computer readable medium storing instructions translatable by at least one processor to implement steps associated with an online presence system as disclosed herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 9 is a flow diagram illustrating one embodiment of a data collection and ontology updating process;

FIG. 10 is a flow diagram illustrating one embodiment of a scoring process; and

FIG. 11 is a flow diagram illustrating one embodiment of a recommendation process.

DETAILED DESCRIPTION

Figure 1:
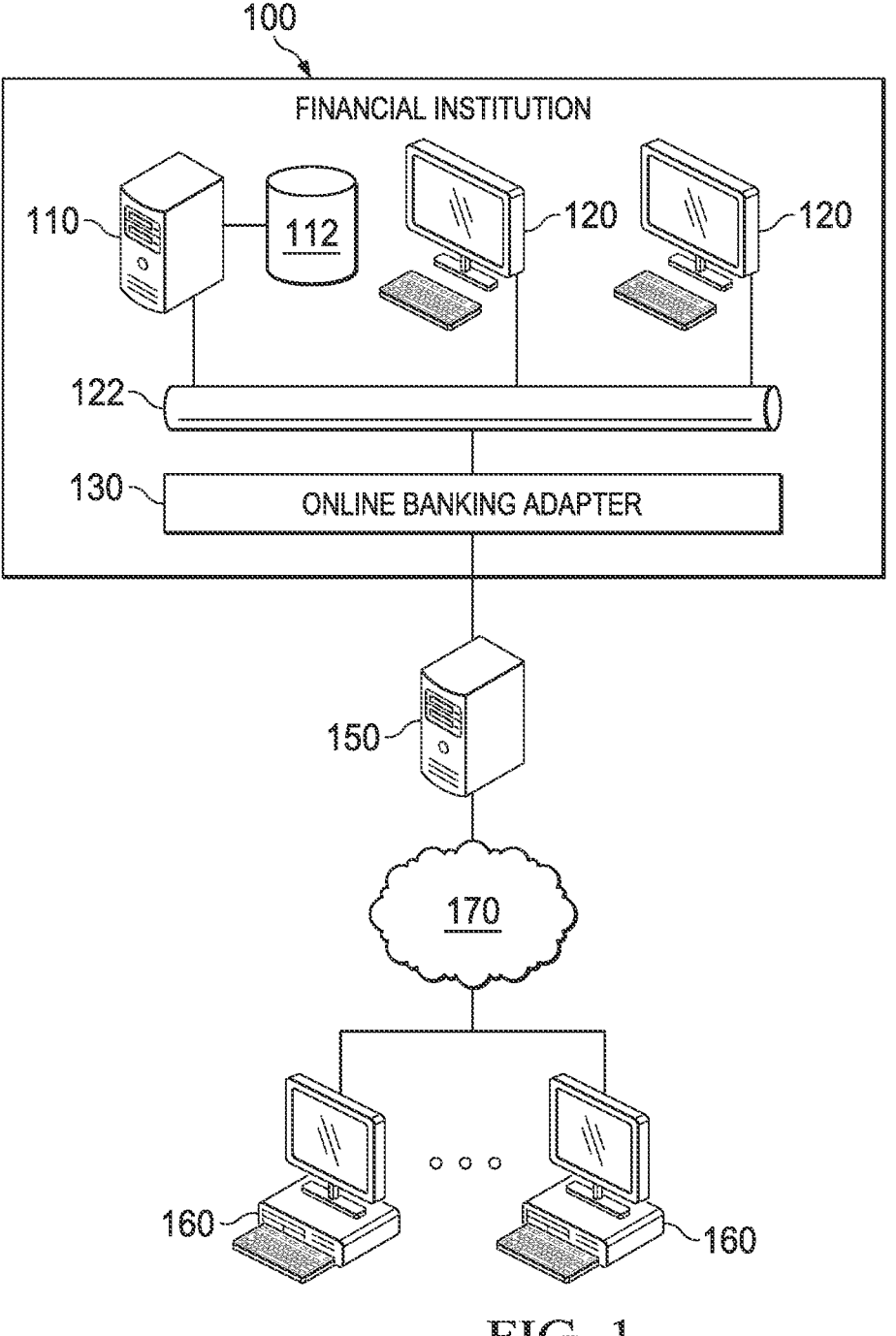
FIG. 1 is a block diagram illustrating one embodiment of an architecture including a financial institution.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

According to embodiments disclosed herein, the distinct systems (e.g., operated by third party providers or by the financial institution themselves) providing an online presence for financial institutions may contain data about a large number of users over many financial institutions. Embodiments as presented herein may be utilized as part of, or in conjunction with, these distinct online presence systems to leverage the data about users of the online presence of the financial institution to make recommendations of financial products to users through the provided online presence.

In particular, embodiments may analyze users to determine similar sets of users and determine recommendations to be made to a particular user based on the set of users with which he is most closely related or may determine similar sets of products to products the user is already utilizing and make recommendations based on the similar products. In other words, data on products, transactions, etc. associated with users may be utilized to group users or products in order to facilitate the making of a recommendation. Other methods of determining recommendations are also contemplated.

In any event, the analysis of user (or other) data in this manner presents a number of difficulties in the context of online (or Internet based) interactions with financial institutions. One of the biggest problems is that while the products offered by financial institutions may be relatively similar in nature (e.g., have similar terms, etc.) the names by which entity refers to their specific product or sets of products may differ wildly. These circumstances makes analysis of data regarding users extremely difficult, as users or products associated with different financial institutions cannot be grouped without having some sort of measure or data about equivalency of products between those financial institutions.

Moreover, specifically in the context of Internet (or network) based financial institutions the problem arises of how such recommendations can be determined and presented in a real time manner such that a user can be presented with recommendations in real time as a user is accessing an online presence of a financial institution.

To address these issues, among others, embodiments as disclosed utilize an ontology. An ontology may be thought of for purposes of this disclosure as a knowledge base. In certain embodiments, then, an ontology including a user ontology, a financial institution ontology, a financial institution product ontology may be utilized. These ontologies may be thought of as a directed or non-directed graph comprised of nodes and relationships among those nodes. Thus, the ontology utilized by embodiments may include a unified ontology comprised of at least a user ontology, a financial institution ontology and a financial institution product ontology. The user ontology comprises nodes representing the various users across financial institutions and their various transactions or other associated data, the financial institution ontology comprises nodes representing the various financial institutions for which an online presence may be provided or other financial institutions for which data on users may be obtained while the financial institution product ontology comprises nodes representing different classes and subclasses of financial institution products, along with the nodes representing the specific products of the financial institutions.

Thus, a unified ontology comprised of at least these three ontologies may allow financial institution products from distinct financial institutions to be associated with classification nodes such that similar products from disparate financial institutions may be associated despite their dissimilar names, descriptions, different institutions, etc. Similarly, the unified ontology may allow users associated with different financial institutions to be associated with their respective financial institutions, transactions or other data and with various classes of products offered by the financial institutions. By utilizing such a unified ontology whereby financial products (and users) may be equated or otherwise associated across financial institutions, embodiments herein may be better able to measure tendencies and patterns of behavior across the entire population of users. Conversely, without such an ontology any analysis of such user or product data would be insular and fragmented, precluding any broader benefit of taking such measures globally.

In describing embodiments of the systems and methods of the present invention, it may first be helpful to go over embodiments of systems and methods for providing an online presence for a financial institution using an example of a platform like those that are typically utilized in conjunction with such financial institutions. FIG. 1 is a block diagram illustrating an embodiment of just such an architecture for conducting transactions at a financial institution. Financial institution 100, which may be a bank or the like, may have a host data management system 110 for managing data associated with the financial institution 100 and conducting transactions in association with this data. In particular, this data may include data on various accounts held with financial institution 100 which may be stored in data store 112 and the transactions may include a variety of account operations which a user may desire to be performed, including such things as displaying account information, transfer of funds between accounts, opening or closing accounts or almost any manipulation of accounts or funds associated with accounts that is desired.

Host system 110 may operate according to a variety of platforms including UNISYS, AS/400, etc. and may interact with one or more software applications (e.g., computer executable instructions on a computer readable medium) to perform the transactions in conjunction with data in data store 112. These software applications may execute all or in part on host system 110 or terminals 120 at the financial institution 100 (or otherwise in communication with host system 110 through a communication network 122) such that users (e.g., bank tellers) at terminals 120 may perform a variety of transactions in conjunction with host system 110 and the associated data in data store 112.

Financial institution 100 may also desire to allow account holders to perform transactions in conjunction with their various accounts and may thus provide the ability to conduct online transactions via one or more interfaces of an online presence. These interfaces may be provided by a distinct online presence system 150 to one or more users at computing devices 160 over a communication network 170 such as the Internet, a Local Area Network (LAN), a Wide Area Network (WAN) or another type of wired or wireless communication link. These interfaces may, for example, include a graphical user interface (GUI), a command line interface, or one or more web pages which may be accessed through a web browser. These web pages may for example be in HTML or XHTML format, utilize JavaScript or Active Server Pages and may provide the ability for a user to conduct transactions in conjunction with accounts which the user is associated.

However, as host system 110 may be designed to interact or interface with a particular software application or messaging format, such as those utilized in conjunction with terminal 120, in order to actually conduct these transactions the interfaces provided by distinct online presence system 150 may interact directly or indirectly (e.g., through one or more other software applications such as Common Gateway Interfaces, an Application Programming Interface (API), Perl scripts, Java applications, etc.) with online banking adapter 130. Online banking adapter 130 may be operable to interact with host system 110 to implement the requested transactions, for example, by emulating those software applications utilized in conjunction with terminals 120. Thus, a user may interact with one or more interfaces provided by distinct online presence system 150 over network 170. These interfaces, or applications associated with these interfaces, may, in turn, utilize online banking adapter 130 to conduct the transactions specified by the user in conjunction with host system 110.

Figure 2:
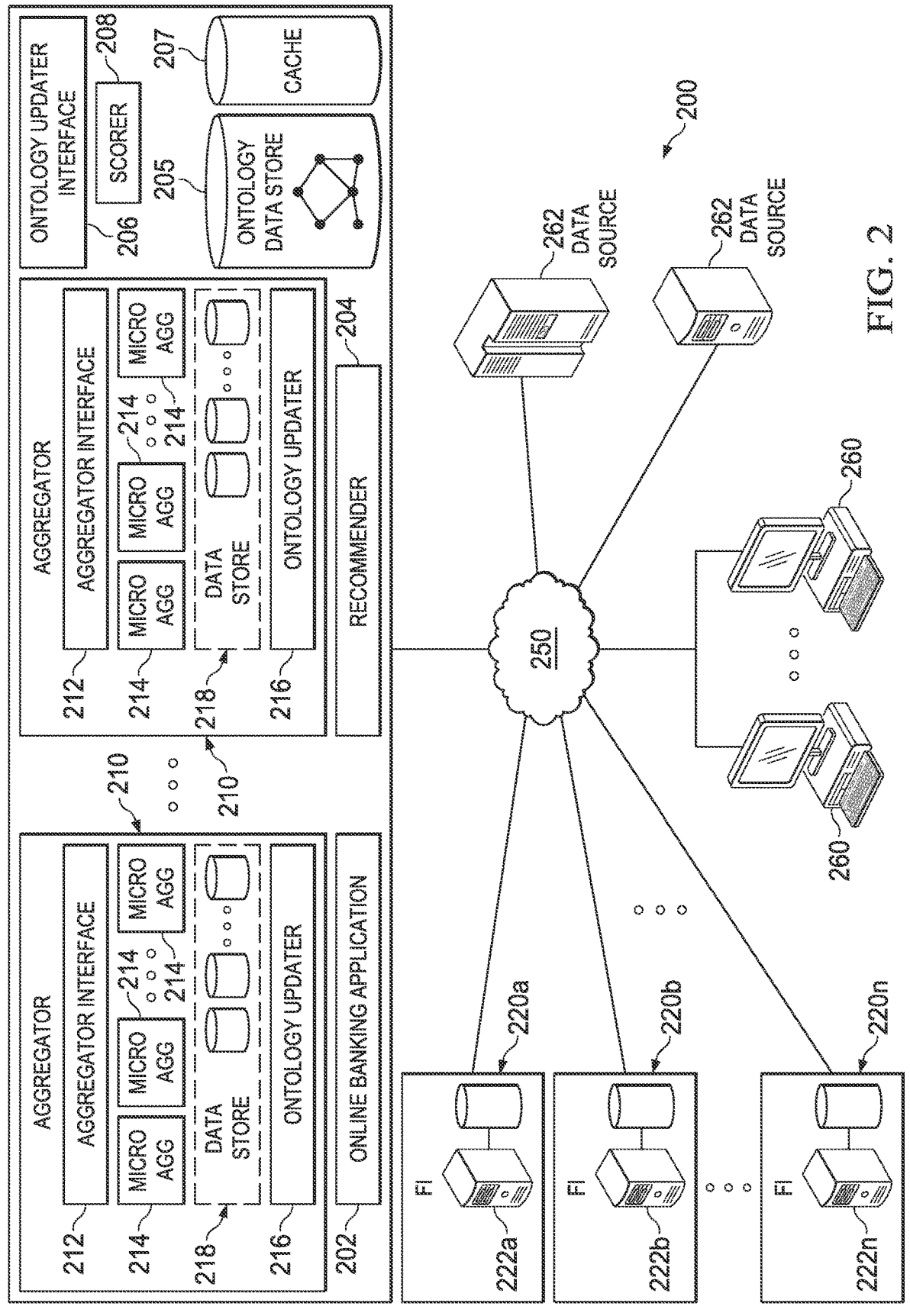
FIG. 2 is a block diagram illustrating one embodiment of a network topology including an online presence system.

As discussed above, such distinct online presence systems that provide online interfaces for financial institutions may provide such a presence for multiple financial institutions and may provide recommendations for financial products offered by those financial institutions in conjunction with such an online presence. Turning now to FIG. 2, one embodiment of a topology including an online presence system 200 for providing an online presence associated with multiple financial institutions 220 where the presence system 200 can provide recommendations to a user in conjunction with providing such an online presence is depicted.

Presence system 200 may be coupled to one or more financial institutions (FIs) 220 with associated host systems 222 over a network 250. This network may be the Internet, a LAN, a WAN, a VPN, a wired network, a wireless network or some other network or combination of networks. Presence system 200 may also be coupled to user devices 260 and data sources 262 over the same or different network or networks.

Presence system 200 may include an online banking application 202 which may provide a set of interfaces that may be accessed by a user at a user device 260 to access functionality or perform transactions in association with a particular FI 220. Such an interface may include a set of web pages or the like, or may be an interface to allow operation of a mobile application resident on the user's device 260, etc.

To facilitate the provisioning of those interfaces by online banking application 202, presence system 200 includes one or more aggregators 210 that serve to obtain, store and process data from one or more of the financial institution 220 host systems 222. Thus, aggregator interface 212 may interact at some time interval (e.g., daily, weekly, hourly, etc.) with a host system 222 (e.g., through an online banking adapter adapted to interface with the host system 222) to obtain data from the host system. This data may include data on the users of financial institution 220 (e.g., account holders or users of products of the FI, etc.), such as the transactions they have performed, account balances, demographic information, or almost any other data that may be accessed or maintained by the host system 222.

This raw data obtained by the aggregator interface 212 may be stored in data store 218. As the data is stored, or at some time interval, the data in the data store 218 may be processed by one or more micro aggregators 214. The processing of the data may include the association of data in the data store 218 (e.g., associating data for the same user), enhancing or clarifying the data in data store 218, for example, by accessing data from data sources 262 which may provide defining data to define aspects of the transaction (e.g., a merchant associated with an individual transaction, etc.), a user's financial history (e.g., credit scores, etc.) and associating this data with the raw data or by refining or altering the raw data itself.

The refined data may then be stored in the data store 218 in association with the raw data (or the raw data itself altered). As such, the data in data store 218 may include data associated with users of financial institutions 220, where the data may include raw data obtained on the user or refined or enhanced data created by micro aggregators 214 or obtained from another data source 262 and associated with the raw data or the user. When online banking application 202 presents interfaces to users on their user devices 260 in association with a financial institution 220 then, the online banking application 202 may access and use the data in the data store 218 to present such an interface, or data in data store 218 may be presented through the interface generated by online banking application 202.

In conjunction with the presentation of an interface for a particular FI 220 then, the online banking application 202 may present one or more recommendations for a product of that FI 220 to the user. In certain embodiments, one or more interfaces provided by the online banking application 202 may include a place for content concerning such a recommendation. Specifically, a user at user device 260 may access an interface for a particular financial institution 220 through online banking application 202. Online banking application 202 may determine that a recommendation is needed and make a call or otherwise interface with recommender 204 to determine a product associated with that financial institution 220 to recommend to that user.

The call from online banking application 202 may be initiated based on the interface being provided to the user at the user device 260. In particular, in one embodiment, when the interface is rendered at the users' device 260 instructions associated with the interface (e.g., JavaScript or the like) may be executed and make a call to online banking application 202 requesting content for a recommendation area of the interface. Other data may also be included in such a request, including, for example, an identifier for the user (User ID), identification of the particular interface being rendered, identification of the financial institution associated with the interface (FIID), or other data.

Recommender 204 may access cache 207 to identify a product associated with that financial institution 220 to recommend to the user. As discussed, ontology data store 205 may include an ontology that includes a unified ontology comprised of a user ontology, a financial institution ontology and a financial institution product ontology. The user ontology comprises nodes representing the various users across financial institutions and their various transactions or other associated data, the financial institution ontology comprises nodes representing the various financial institutions for which an online presence may be provided or other financial institutions for which data on users may be obtained while the financial institution product ontology comprises nodes representing different classes and subclasses of financial institution products, along with the nodes representing the specific products of the financial institutions.

Ontology updater interface 206 allows an administrator or other user associated with a financial institution 220 to define products offered by the financial institution 220, including, providing a type, class (category) or subclass (subcategory), defining characteristics, a name, etc. associated with products offered by that FI 220. The ontology updater interface 206 may update the ontology with respect to that financial product by, for example, creating a node representing that financial product in the financial institution product ontology, analyzing the characteristics or other definitional aspects of that product to associate the created node with one or more nodes representing the class or sub class to which the financial product belongs, etc. Such classes, sub classes, categories, hierarchies of financial products will be better understood with reference to the FIGS. 6 and 7. Thus, the unified ontology is updated with a node representing the financial product and relationships relating that financial product to the financial institutions offering it, along with associating node representing that financial product with the classes or subclasses defining a type or sub type of that financial product. The ontology updater interface may also allow the administrator or other user to submit or store content associated with recommending the added product (e.g., a .jpg or banner advertisement, a video, etc.). This content may be stored in a content store (not shown) for the online presence system 200.

Moreover, ontology updater 216 of aggregator 210 may update the ontology stored in data store 205 utilizing the data stored in data store 218 at certain intervals. Specifically, in certain embodiments, the ontology updater 216 may define new nodes of the user ontology for users whose data has been collected from financial institutions but that are not yet represented in the ontology and may associate the nodes representing those users with the financial institution (e.g., the node representing the financial institution in the financial institution ontology) from which data is obtained. Additionally, the user may be associated with the financial products of that financial institution (e.g., nodes representing those financial institution products in the financial institution product ontology) that the user currently utilizes. Moreover, the user node defined for users may be updated with data regarding the user including the transactions or other data associated with the user. In some embodiments, other ontologies or portions of ontologies may be utilized to represent such data and may be unified with the user ontology, financial institution ontology or financial institution product ontology (or portions thereof).

Scorer 208 may run at certain intervals to determine recommendation scores for products for particular users. Specifically, the scorer 208 may determine for users represented in the ontology, scores for one or more products of each financial institution associated with the user. These scores may be reflective of an affinity (e.g., a relative affinity) between the user and that product or a probability or likelihood that the user would find such a product germane.

In one embodiment, scorer 208 may employ a collaborative filtering algorithm that associates similar users across financial institutions based on a wide variety of criteria, including FI products already utilized by users, demographic information associated with the user or even specific behavior associated with the various users (e.g., shopping at particular stores, purchases of certain products, account balances, etc.). This presence and specificity of such data may allow a very accurate refinement of groups of users and highly accurate grouping of users and scoring of products of financial institutions relative to those users.

Thus, scorer 208 may determine a score associated with each product of a financial institution associated with a user (or product or both) and associate those scores with both the user and that product in the ontology. Thus, in the unified ontology each user (e.g., node representing a user) may be associated with a financial institution (e.g., a node representing a financial institution), that financial institution's products (e.g., nodes representing those products) and a score for each of those products relative to that user. Scorer 208 may account for the fact that a user may already utilize certain products and thus those products should not be recommended to the user.

The score determined for each product for a user may be stored as a number or the score may be used to rank the products and the products stored as an ordered list. For example, each user may be associated with a list of financial products (e.g., user_1: [item_1, item_2, . . . , item_N]) created by scorer 208. Thus, the determined scores for each financial institution product need not be kept; rather, the system may only need to reference the ordered list itself.

The ordered list of financial products may include some or all of the products for a particular financial institution. A user may have multiple lists, for example, one for each financial institution that the user accesses via the system. When the user logs into the online banking application 202 for a financial institution, the list for that financial institution may be accessed in order to provide recommendations for products for that financial institution.

Recommender 204 thus accesses the ontology in the ontology data store 205 or cache 207 and returns a set of financial products associated with the user and the financial institution from the ontology. Online banking application 202 may then select one or more top scored products to recommend to the user. In one embodiment, the ontology may be traversed to find the nodes for financial products related to both the user of interest and the financial institution of interest and based on the scores related to both the user and the identified financial products, the set of financial products with the highest scores may be determined. The recommender 204 may return a set of products to the online banking application 202. Online banking application may then determine one or more of the set of products to recommend to the user. The selection may be the highest scored product, a random selection from the top 5 most highly scored products, or some other method for selecting a product or product for the financial institution to recommend to the user.

The selected product (or an identifier thereof) can then be returned to the online banking application 202. The online banking application 202 may obtain content associated with the recommended product, for example, from a file system or database containing content associated with recommending products to users (not shown) to obtain content to include in the interface being generated for the user. The content, may, for example, be a banner or other ad specifying the financial product and that is has been selected for the user. Other methods of presenting the selected recommended financial product to the user may be utilized and are contemplated herein. The selected content may then be returned from the online banking application 202 to the user's device 260 in response to the initial request, where such content is presented to the user in the interface at the user's device 260.

Figure 3:
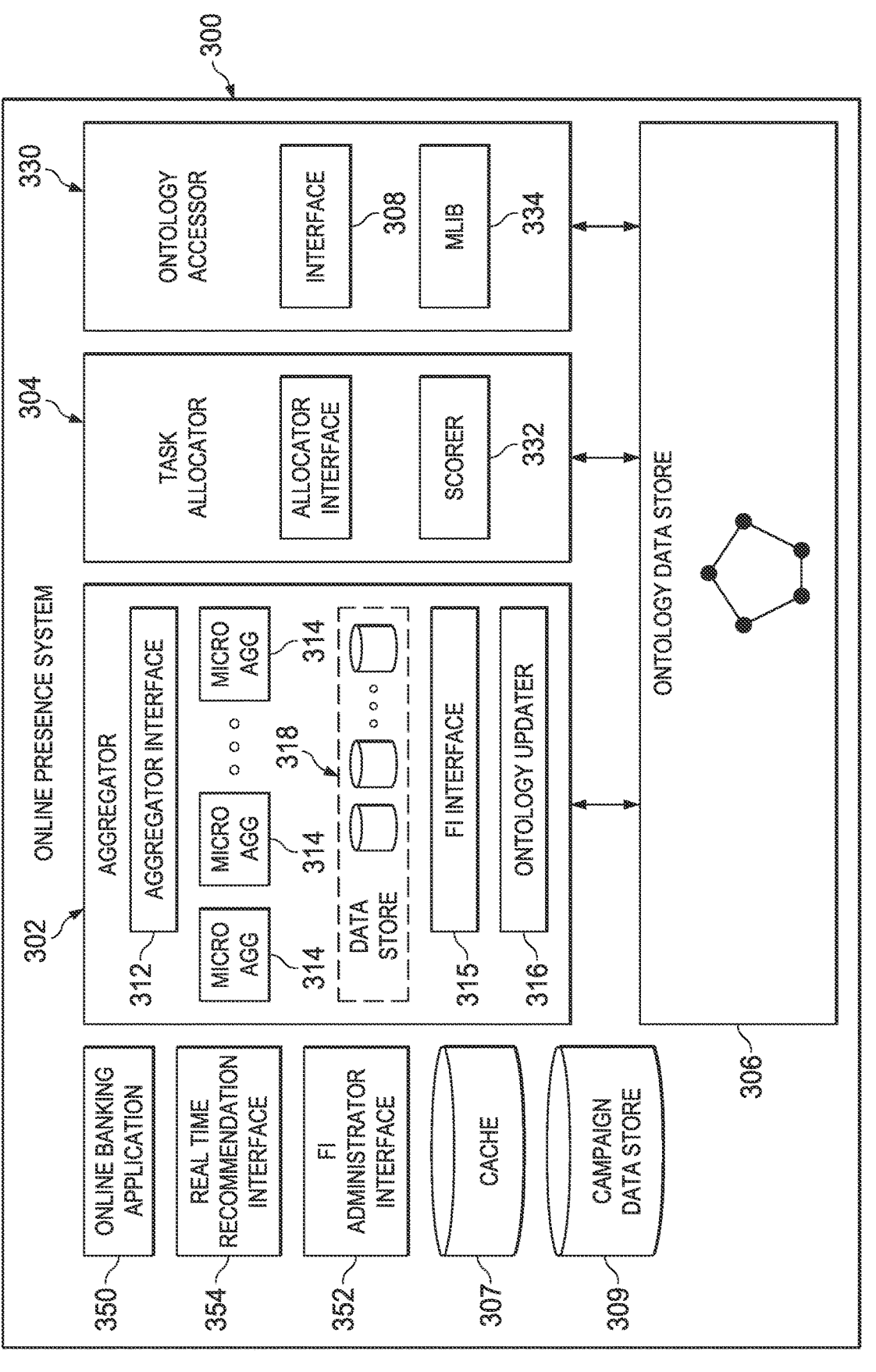
FIG. 3 is a block diagram illustrating one embodiment of an online presence system.

It may now be useful to go into more detail regarding specific embodiments of an architecture for implementing an online presence system that includes functionality for recommending financial products in online distributed networks. Referring then to FIG. 3, embodiments of such an online presence system with a recommender are depicted in more detail. Here, online presence system 300 includes an online banking application 350, a real time recommendation interface 354, an FI administrator interface 352, an aggregator 302 (referred to colloquially as wheelbarrow), a task allocator 304 (referred to colloquially as taskmaster), an ontology data store 306, a cache 307, and an ontology interface 308 (referred to colloquially as audiences). Each of the taskmaster, wheelbarrow, and audiences may implement a distinct microservice. In one embodiment, each microservice exposes functionality and communicates with external entities via an associated representational state transfer (REST) application programming interface (API).

As discussed, online banking application 350 may provide a set of interfaces that may be accessed by a user at a user device to access functionality or perform transactions in association with financial institutions. Such an interface may include a set of web pages or the like, or may be an interface to allow operation of a mobile application resident on the user's device, etc. When presenting interfaces for a particular financial institution one or more of these interfaces may present a recommendation to the user for a particular product of that financial institution based on that user and the ontology stored in ontology data store 306.

Ontology data store 306 may be NoSQL data store with a distributed architecture that facilitates access and servicing of requests from aggregator 302, task allocator 304 or ontology interface 308. A NoSQL data store may include a mechanism for storage and retrieval of data that is modeled in means other than the tabular relations used in relational databases. For example, ontology data store 306 may be a Cassandra cluster. Cassandra is a decentralized NoSQL database, designed for fault tolerance and scalability. Cassandra's operational model allows a multitenant solution to be constructed, with large amounts of user data from many FIs distributed across multiple nodes in different datacenters. Each node may be utilized to satisfy a particular requirement or perform a specific function critical to the application as a whole as will be discussed in more detail. The partitioning of single multitenant database across distinct physical nodes is not possible with conventional relational database technologies.

Thus, each of the aggregator 302, task allocator 304 or ontology interface 308 may interface with the data store 306 using an interface designed to work efficiently or effectively with such a data store 306 such as Spark or Spark SQL. Spark is a distributed computing framework that is part of the Apache suite of open source software projects. Spark SQL and mlib 334 are two components of Spark which may be utilized by certain embodiments. Mlib 334 exposes a library of supervised machine learning algorithms. These machine learning algorithms are used to provide behavioral classifications that supplement the product recommendations generated by collaborative filtering and stored in ontology of ontology data store 306.

Spark SQL, another component of Spark that may be utilized, provides a structured, indexed representation of the unstructured data housed in the Cassandra cluster. This allows for ad-hoc querying of Cassandra-resident data; something which is not possible with Cassandra alone. Spark SQL also acts as an integration point for absorbing disparate and unforeseen data sources into the Cassandra cluster of ontology data store 306. Embodiments of such a data store and an architecture therefore are discussed at a later point herein.

Specifically, the data store 306 may include a unified ontology comprised of a user ontology, a financial institution ontology and a financial institution product ontology. The user ontology comprises nodes representing the various users across all financial institutions that employ online presence system 300 and their various transactions or other associated data, the financial institution ontology comprises nodes representing the various financial institutions employing online presence system 300 or other financial institutions for which data on users may be obtained while the financial institution product ontology comprises nodes representing different classes and subclasses of products of all the financial institution employing online presence system 300, along with the nodes representing the specific products of the financial institutions.

FI administrator interface 352 allows an administrator or other user associated with a financial institution to define products offered by the financial institution, including, providing a type, class (category) or subclass (subcategory), defining characteristics, a name, etc. associated with products offered by that institution. FI administrator interface 352 may update the ontology with respect to that financial product by, for example, creating a node representing that financial product in the financial institution product ontology, analyzing the characteristics or other definitional aspects of that product to associate the created node with one or more nodes representing the class or sub class to which the financial product belongs, etc. Thus, the unified ontology is updated with a node representing the financial product and relationships relating that financial product to the financial institutions offering it, along with associating node representing that financial product with the classes or subclasses defining a type or sub type of that financial product. The FI administrator interface 352 may also allow the administrator or other user to submit or store content associated with recommending the added product (e.g., a .jpg or banner advertisement, a video, etc.). This content may be stored in a content store (not shown) for the online presence system.

The FI administrator interface 352 may also allow the administrator or other user at the FI to create, actuate or disable campaigns related to specific products in the ontology. A campaign may be comprised of recommendations, style, content, an audience, and an FI product. In creating a campaign, an FI administrator may select a product or an experience (herein "product") to be recommended, for example, by real time recommendation interface 354. The FI administrator may define an audience comprising a group of users for promoting the product or experience using the campaign. The FI administrator may choose one or more traits to define the audience. The FI administrator may also choose how much influence the traits have in the recommendation process. If no traits are selected or the FI administrator chooses zero influence for all of the chosen traits, then the system will automatically determine the best candidates (e.g., via ensemble learning process). If the FI administrator chooses a great level of influence, then the recommendations can be tailored with no regard to the ensemble recommendation process. There may also be a hybrid solution between these extremes where the system will weight the traits in the ensemble recommendation process. The campaign may then be stored (e.g., in campaign data store 309 in online presence system 300).

Aggregator 302 serves to obtain, store and process data from the host systems of all the financial institutions that utilize online presence system 300 using an FI interface 315. Thus, FI interface 315 may interact at some time interval (e.g., daily, weekly, hourly, etc.) with a host system of an FI (e.g., through an online banking adapter adapted to interface with the host system) to obtain data from the host system. The type of data to obtain, the financial institutions from which to obtain the data, the time interval at which to obtain data, the credentials or interfaces to use with particular host systems, etc. may be configured by an administrator of the online presence system or other user utilizing aggregator interface 312. The data obtained from host systems at financial institutions may include data on the users of the financial institution, such as the transactions they have performed, account balances, demographic information, or almost any other data that may be accessed or maintained by the host system or other systems of the financial institutions.

This raw data obtained by the FI interface 315 may be stored in the aggregator data store 318. As the data is stored in the aggregator data store 318, or at some time interval, the data in the data store 318 may be processed by one or more micro aggregators 314. Each of the micro aggregators 314 may have a different and distinct task with respect to the data in data store 318, including the normalization, refinement, association or enhancing of such data. For example, the processing of the data by micro aggregators 314 may include the association of data in the data store 318 (e.g., associating data for the same user), enhancing or clarifying the data in data store 318, for example, by accessing data from other (e.g., third party) data sources which may provide defining data to define aspects of the transactions carried out by a user (e.g., a merchant associated with an individual transaction, etc.), a user's financial history (e.g., credit scores, etc.) or other data. The micro aggregator 314 may associate this data with the raw data or by refining or altering the raw data itself.

The refined data may then be stored in the data store 318 in association with the raw data (or the raw data itself altered). As such, the data in data store 318 may include data associated with users of financial institutions, where the data may include raw data obtained on the user or refined or enhanced data created by micro aggregators 314 or obtained from another data source and associated with the raw data or the user. When online banking application 350 presents interfaces to users on their user devices in association with a financial institution the online banking application 350 may access and use the data in the data store 318 to present such an interface, or data in data store 318 may be presented through the interface generated by online banking application 350.

Moreover, ontology updater 316 of aggregator 310 may update the ontology stored in data store 306 utilizing the data stored in data store 318 at certain intervals. Specifically, in certain embodiments, the ontology updater 316 may define new nodes of the user ontology for users whose data has been collected from financial institutions but that are not yet represented in the ontology and may associate the nodes representing those users with the financial institution (e.g., the node representing the financial institution in the financial institution ontology) from which data is obtained. Additionally, the user may be associated with the financial products of that financial institution (e.g., nodes representing those financial institution products in the financial institution product ontology) that the user currently utilizes. Moreover, the user node defined for users may be updated with data regarding the user including the transactions or other data associated with the user. Thus, the user nodes of the unified ontology are updated to represent the users, the financial products utilized by these users and associated data obtained from the financial institution or determined based on that data. Accordingly, in certain embodiments, the wheelbarrow microservice is responsible for transporting user-product relationship data from an array of distinct relational databases (q2db_1, q2db_2, . . . , ext_1, ext_2, . . . ) into a common Cassandra cluster of ontology data store 306.

Task allocator 304 may be responsible for the scoring of users or financial products (items) represented in the ontology of ontology data store 306. Accordingly, in one embodiment, scorer 332 may be responsible for the application of collaborative filtering algorithms to the user data stored in the ontology. In particular, in one embodiment, scorer may employ the scoring algorithm as discussed herein.

Thus, scorer 332 of taskmaster may determine a score associated with each product of a financial institution for a user (or product or both) who may be associated with that financial institution and associate those scores with both the user and that product in the ontology. Thus, in the unified ontology each user (e.g., node representing a user) may be associated with a financial institution (e.g., a node representing a financial institution), that financial institutions' products (e.g., nodes representing those products) and a score for each of those products relative to that user.

In conjunction with the presentation of an interface for a particular FI then, the online banking application 350 may present one or more recommendations for a product of that FI to the user. In certain embodiments, one or more interfaces provided by the online banking application 350 may include a place for content concerning such a recommendation. Specifically, a user at a user device may access an interface for a particular financial institution through online banking application 350. Online banking application 202 may determine that a recommendation is needed and make a call or otherwise interface with real time recommendation interface 354 to determine a product associated with that financial institution to recommend to that user.

The call from online banking application 350 to real time recommendation interface 354 may be initiated based on the interface being provided to the user at the user device. In particular, in one embodiment, when the interface is rendered at the users' device instructions associated with the interface (e.g., JavaScript or the like) may be executed and make a call to online banking application 350 requesting content for a recommendation area of the interface. Other data may also be included in such a request, including, for example, an identifier for the user, identification of the particular interface being rendered, identification of the financial institution associated with the interface, or other data.

Real time recommendation interface 354 may access ontology of ontology data store 306 or cache 307 to identify a product associated with that financial institution to recommend to the user. Specifically, real time recommendation interface 354 may access an interface 308 presented by Ontology accessor 330 to determine one or more products to recommend to the user. The ontology accessor 330 (e.g., audiences) is responsible for exposing data to a user interface application. In addition to the user-product relationship data that is used by the collaborative filtering algorithms to generate predictions and product recommendations, the interface 332 (e.g., the audiences api) exposes analytics data collected or determined. This analytics data includes traditional performance metrics such as click-through rates, impression counts, etc.

Ontology accessor 330 thus accesses the ontology in the ontology data store 306 to determine a set of top scored (e.g., the top 5 or top 10) financial products associated with the user and the financial institution from the ontology. In one embodiment, the ontology may be traversed to find the nodes for financial products related to both the user of interest and the financial institution of interest and based on the scores related to both the user and the identified financial products, the set of financial products with the highest scores may be determined. The set of products may then be returned to the real time recommendation interface 354 which may then select one or more of this identified set to return to the online banking application 350 to recommend to the user. The selection may be the highest scored product, a random selection from the top 5 most highly scored products, or some other method for selecting a product or product for the financial institution to recommend to the user.

The selected product (or an identifier thereof) can then be returned to the online banking application 350. The online banking application 350 may obtain content associated with the recommended product, for example, from a file system or database containing content associated with recommending products to users (not shown) to obtain content to include in the interface being generated for the user. The content, may, for example, be a banner or other ad specifying the financial product and that has been selected for the user.

Figure 4:
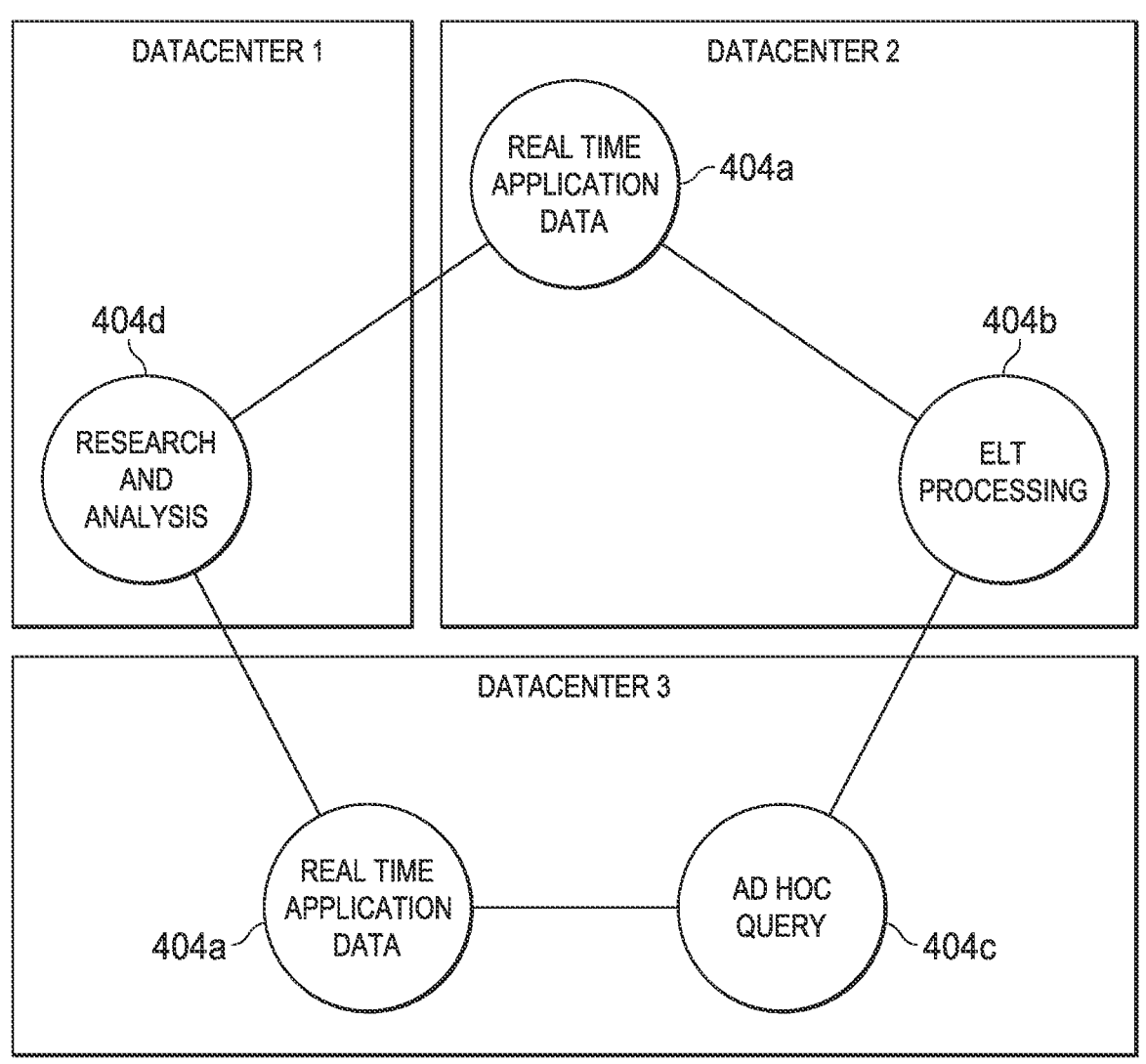
FIG. 4 is a block diagram illustrating one embodiment of an ontology data store.

Moving now to FIG. 4, one embodiment of an architecture for implementing an ontology data store is depicted. Specifically in one embodiment, an ontology data store employing Cassandra may be implemented across three (or more) data centers 402 utilizing five nodes 404. Each of the nodes may serve a different microservice of the online presence system and be replicated in such a manner that the nodes, the distribution of those nodes and the multiple data centers increases both fault tolerance, availability and speed of access. Cassandra's operational model has allowed the construction a multitenant solution, with large amounts of user data from many FIs distributed across multiple nodes in different datacenters. Each node may be utilized to satisfy a particular requirement or perform a specific function (e.g., "Research and Analysis", "Ad Hoc Query", or "Real Time Application Data" from the diagram) critical to the application as a whole. Additionally, as illustrated in the diagram, nodes may be located in physically distinct datacenters, providing resiliency in the event of a datacenter outage (Cassandra is able to survive multiple node failures with no loss of functionality.) In some embodiments, Ad Hoc Query 404c may be a relational database.

Thus, the nodes 404 may comprise a Realtime Application Data node 404a. These nodes provide functionality to the Audiences microservice by directly exposing user data for basic, unfiltered querying. Such queries might, for instance, return all known attribute data associated to a single user. ELT Processing nodes 404b provide functionality to the Wheelbarrow microservice by ingesting large amounts of batch data from that microservice's various processes. Ad Hoc Query nodes 404c provide functionality to the Audiences microservice. Specifically, the Spark SQL processes will execute unfiltered queries against these nodes. These queries will, for example, return all user attribute data for an entire FI, which the Audiences microservice will index and hold in memory (e.g., via Spark SQL) to be made available for ad hoc querying via the Audiences API. Research and Analysis nodes 404d provide functionality to the Taskmaster microservice by accepting that service's write-heavy workload. As the Taskmaster service, for instance, computes product recommendations via the user-based collaborative filtering technique, those recommendations are persisted as database writes into the Research and Analysis Cassandra nodes.

Figure 5:
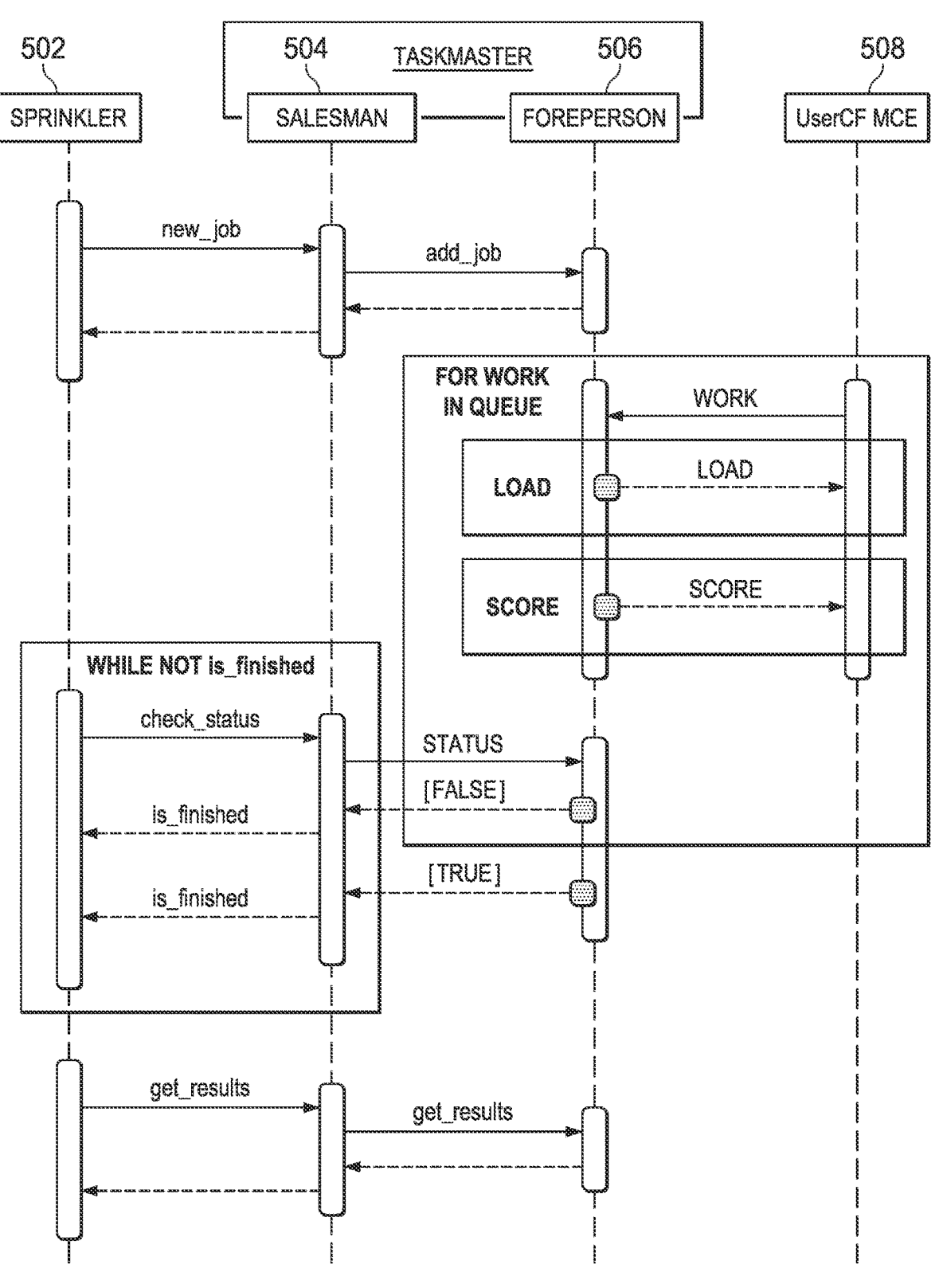
FIG. 5 is a flow diagram illustrating one embodiment of job processes for scoring.

Looking now at FIG. 5, a depiction of one embodiment of an architecture employed by embodiments of a task allocator is presented. Specifically, a task allocator (e.g., taskmaster) may be architected to utilize four processes, a sprinkler process 502, a salesman process 504, a foreperson process 506 and a scoring process 508 (e.g., a user or item based collaborative filtering process). The sprinkler process 502 serves to access a configuration database that may be configured by operators of an online processing system, where the configuration defines the type or parameters of the scoring process for financial institution products (e.g., user based collaborative filtering, item based collaborative filtering) or other processing or analysis of data.

Based on this configuration, the sprinkler process 502 dispatches jobs to the salesman process 504 which may, in turn, add a job to a queue accessible by foreperson process 506. For each of the jobs in this queue, the foreperson process 506 may determine the data needed to complete the job and load the data needed into the working memory of the online processing system such that the entire set of data for that job can be accessed in the working memory of the system while the job is being processed. In one embodiment, a job may be removed from the queue and processed in response to a request or other notification from scoring process 508 that it can process another job. The foreperson 506 then uses the scoring process 508 to access the data in memory for that job to perform the scoring for that data.

While that job is being processed, the sprinkler process 502 may, at some time interval, request a status on that job from the salesman process 504. The salesman process 504, in turn, requests a status from the foreperson process. If the job is still being processed the salesman process 504 may return a "false" indicator indicating the job is not complete while if the job is complete and the scoring data for the job available, a "true" indicator may be returned. The salesman process 504 can then return the status indicator to the sprinkler process 502. If the job is finished the sprinkler process 502 may request the associated results from the salesman process 504 which may request the results from the foreperson process 506. The foreperson process 506 may return the results to the salesman process 504 which returns them to the sprinkler process 502. The sprinkler process 502 (or another process) can then serve to update the ontology with the results if needed.

Figure 6:
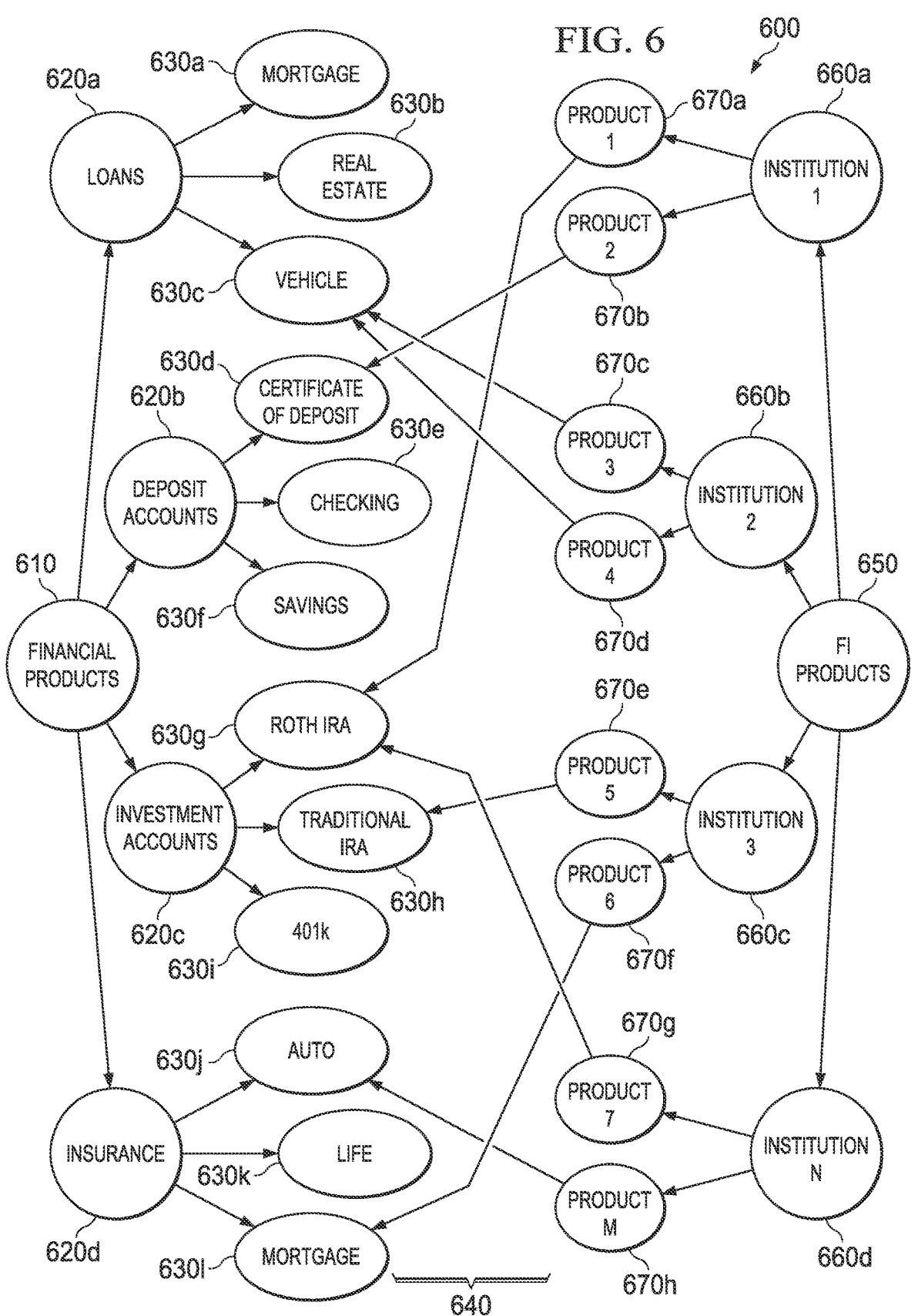
FIG. 6 is a diagram illustrating an ontology according to one embodiment.

Turning now to FIG. 6, an example ontology according to embodiments is shown. Ontology 600 is comprised of nodes 610, 620, 630, 650, 660, and 670. Ontology 600 may be comprised of categories 620 and subcategories 630 of financial products 610. FI products 650 may comprise a number of products 670 from various financial institutions 660. As can be seen, ontology 600 can be used to represent relationships among the nodes, with arrows 640 representing relationships (e.g., classifications) between financial product subcategories 630 and financial institution products 670.

The left half of the ontology (nodes 610, 620, and 630) provides generic descriptors for financial products to which the specific products of the various financial institutions (right half on ontology 600, including nodes 650, 660, and 670) may be associated with (e.g., for classification purposes). For example, node 630g represents a Roth Individual Retirement Account (IRA), which is a subcategory of an investment account 620c. Investment accounts 620c are one category of financial products 610. As shown in FIG. 6, the Roth IRA 630g has two products associated with it, product 1 670a and product 7 670g. Product 1 670a and product 7 670g may therefore be grouped together as similar products, despite the fact that product 1 670a is from institution 1 660a and product 7 is from institution n 660d and may have different attributes (e.g., different names, interest rates, etc.).

The relationships among nodes in ontology 600 are only examples and are not to be limited to the relationships shown. Any of the nodes of FI products 650 may be mapped to any one or more nodes of financial products 610. A single product may fall under one or more categories or subcategories of product and a single category or subcategory may have several financial products associated with it. A single institution may have multiple financial products in the same category or subcategory. For example, institution 2 660b has two financial products 670c and 670d which are both vehicle loans and thus are both associated with node 630c.

Using such an ontology, financial products (e.g., 670) from multiple financial institutions may be classified, allowing customer data for each classification to be aggregated and analyzed, regardless of the name of the financial product or the financial institution. By using data across multiple FIs, a larger sample size may be obtained, resulting in improved behavioral predictions.

Figure 7:
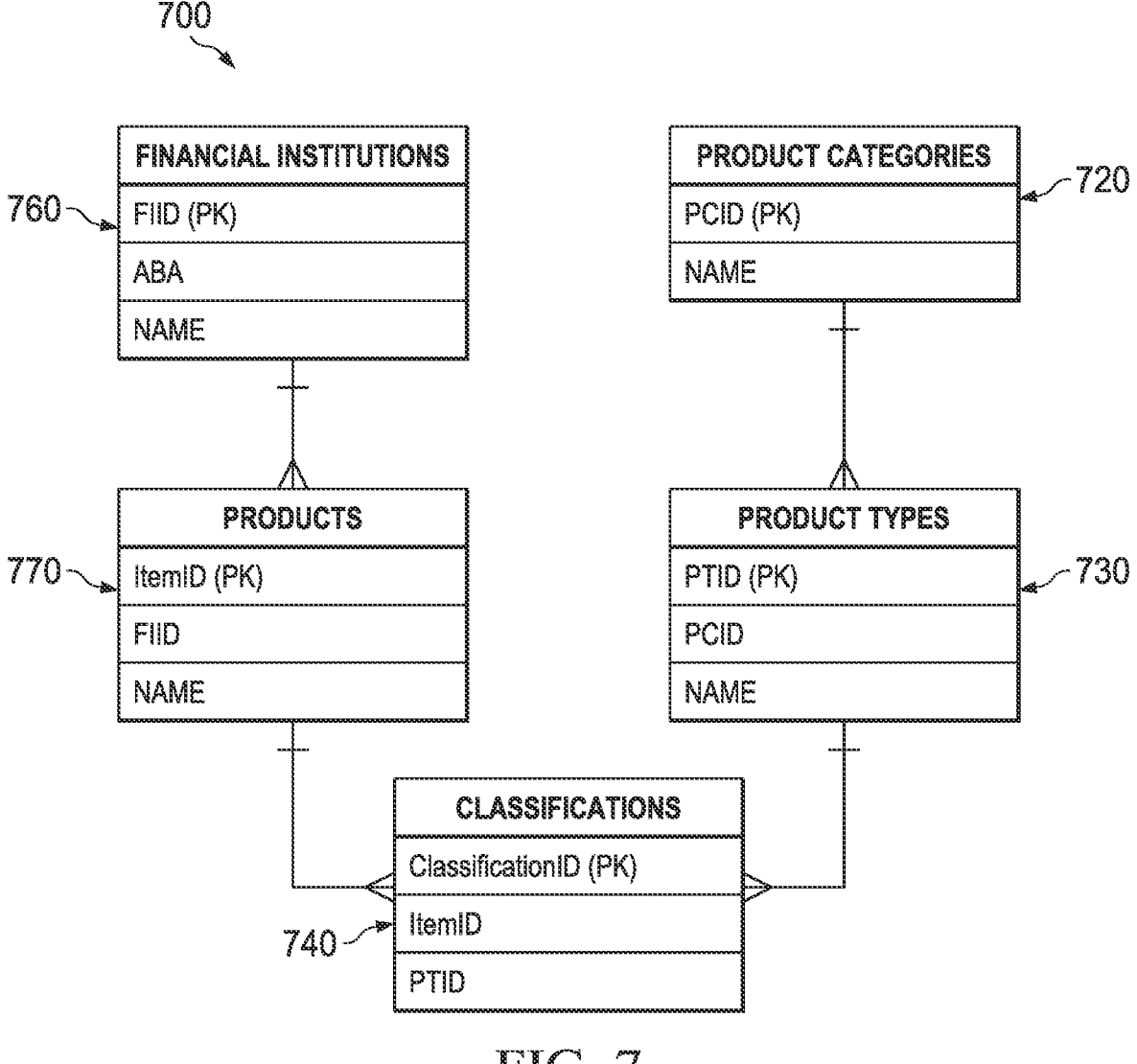
FIG. 7 is a diagram illustrating an ontology schema according to one embodiment.

The example ontology 600 of FIG. 6 is not an exhaustive list of financial products. For instance, an ontology may have the following product types:

- 401k Plan
- 403b Plan
- 529 Plan
- Auto Loan
- Brokerage Investment
- CD or Share Certificate
- Checking or Share Draft
- Commercial Checking or Share Draft
- Commercial Credit Card
- Commercial Line of Credit
- Commercial Loan
- Commercial Real Estate
- Commercial Savings or Share Deposit
- Consumer Checking or Share Draft
- Consumer Credit Card
- Consumer Line of Credit
- Consumer Loan
- Consumer Savings or Share Deposit
- Credit Card
- Deposit Account
- Escrow Account
- Home Equity Line of Credit
- Home Equity Loan
- Insurance
- Investment
- Loan
- Money Market Account
- Mortgage Loan
- Non-Traditional Products
- Other Cash Mgmt. Products
- Roth IRA
- Safe Deposit Box
- Savings or Share Deposit
- Small Business Loan
- Traditional IRA
- Trust
- Vehicle Loan FIG. 7 shows an example for an ontology schema according to embodiments. Ontology schema 700 may be comprised of a set of tables stored in a database. Classifications table 740 (corresponding to arrows 640 from FIG. 6) shows the association between products 770 and product types 730. Classifications table 740 may have entries for a Classification ID, an ItemID, and a Product TypeID (PTID). Entries of Classifications table 740 may be performed by administrator input (e.g., by an administrator of an FI). PTID is also found in the Product Types table 730 along with a name for the product type and a Product Category ID (PCID). PCID is also found in Product Category table 720 along with an entry for the name of the product category. Turning to the other portion of the schema, ItemID of Classifications table 740 is also found in Products table 770 along with a Financial InstitutionID (FIID) and a name for the product. FIID is also found in Financial Institutions table 760 along with ABA and the name of the financial institution.

Figure 8:
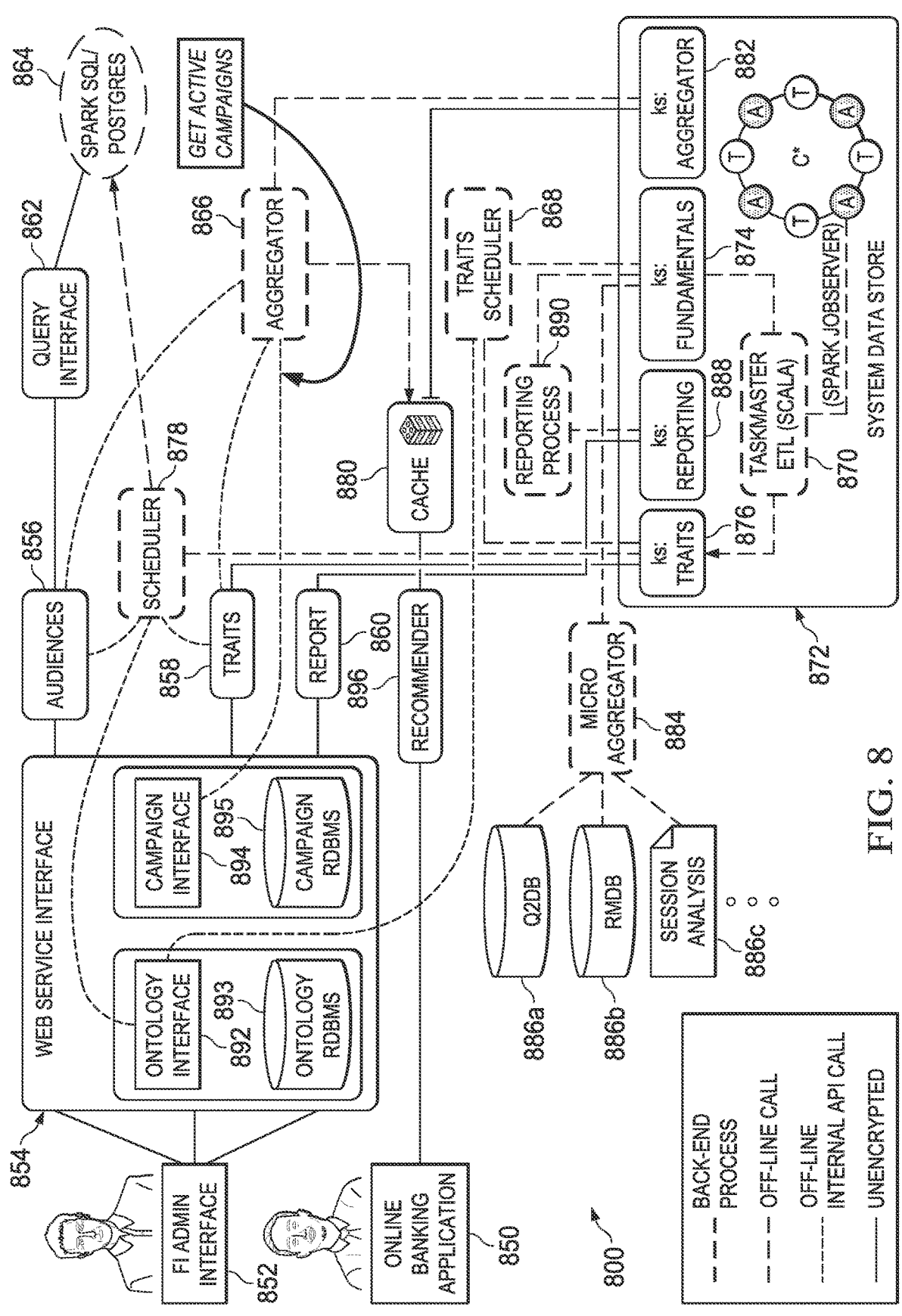
FIG. 8 is a block diagram illustrating one embodiment of a network topology including an online presence system.

FIG. 8 shows an example of a system 800 according to one embodiment. System 800 may interact with a plurality of financial institutions to collect data from the financial institutions. System data store 872 may be used to store data (e.g., raw data, traits, etc.) used by the system. The collected data may be used to create (or update) an ontology which may be used by the system in recommending products. System 800 may also interact with an FI administrator via FI administrator interface 852 to define campaigns for promoting products. Further, system 800 may interact with online banking application 850 to display product recommendations associated with the campaigns defined by the FI administrator. The product recommendations may be displayed to users logging into online banking application 850 (e.g., via a real-time recommendation interface-not shown).

By accessing data from multiple financial institutions, user behavior for users across several financial institutions can be analyzed using collaborative filtering to generate more accurate predictions than if data from only a single financial institution were analyzed.

To this end, one or more micro aggregators 884 may receive raw data from a variety of data sources 886 and store the raw data onto fundamentals keyspace 874 (e.g., in a relational database table). Data sources 886 may include data sources associated with FIs, such as in an FI on-premises system or third party data centers. The raw data received from data sources 886 may include data on users, such as which users own which products, how many products each user owns, transactional behavior of the users, user online banking session data, click-through or other impression data, or other behavioral data.

Taskmaster 870 may use an Extract, Transform, and Load (ETL) process to generate traits such as an ordered list of FI products. Taskmaster 870 may use the raw data from fundamentals keyspace 874 to generate an initial score for each FI product at each FI that a user accesses via online banking application 850 (e.g., by collaborative filtering (CF) techniques discussed below). Taskmaster 870 may generate scores without regard to campaigns. The score may be an indication of the relevance of the FI product for that user. For example, the score may represent a prediction of the likelihood of the user purchasing the FI product. The FI products may then be sorted according to the score to generate an ordered list. For example, each user may be associated with a list of financial products (e.g., user_1: [item_1, item_2, . . . , item_N]). An ordered list of FI products may thus be generated for each user for each financial institution that the user interacts with via online banking application 850.

Traits scheduler 868 may also generate traits using the raw data in fundamentals keyspace 874. Traits scheduler 868 may generate simple traits such as average daily account balance for a user. In one embodiment, traits scheduler 868 may use an Extract, Transform, and Load process. The traits generated by taskmaster 870 and traits scheduler 868 may be stored in traits keyspace 876. Thus, traits keyspace 876 may contain an identification of the users and a set of traits for each user. The data stored in traits keyspace 876 may be used by the system to determine one or more FI products to recommend to a user.

In one embodiment, query data store 864 stores a copy of the data from traits keyspace 876. This may be done for performance reasons (e.g., query data store is faster to access than system data store 872. Scheduler 878 may run at desired intervals to populate query data store 864. Scheduler 878 may also retrieve ontology information from ontology database 893 via ontology interface 892 (which may be an application programming interface). Aggregator 866 may receive traits data from either traits keyspace 876 or query data store 864 via audiences component 856 and query interface 862. In one embodiment, query interface 862 may be an application programming interface.

Ontology data store 893 may include a unified ontology comprised of a user ontology, a financial institution ontology and a financial institution product ontology. The user ontology comprises nodes representing the various users across all financial institutions that employ online presence system 800 and their various transactions or other associated data, the financial institution ontology comprises nodes representing the various financial institutions employing online presence system 800 or other financial institutions for which data on users may be obtained while the financial institution product ontology comprises nodes representing different classes and subclasses of products of all the financial institution employing online presence system 800, along with the nodes representing the specific products of the those financial institutions.

The ontology stored in ontology data store 893 may be duplicated on system data store 872 to improve access to the ontology information for processes such as those performed by scheduler 878, aggregator 866, etc. Traits scheduler 868 may access the ontology in ontology data store 893 via a call through ontology interface 892. Ontology interface 892 may retrieve ontology data from ontology data store 893 and return the ontology data to traits scheduler 868. Traits scheduler 868 may then store the ontology data in system data store 872.

FI administrator interface 852 allows an administrator or other user associated with a financial institution to define products offered by the financial institution, including, providing a type, class (category) or subclass (subcategory), defining characteristics, a name, etc. associated with products offered by that institution. FI administrator interface 852 may update the ontology with respect to that financial product by, for example, creating a node representing that financial product in the financial institution product ontology, analyzing the characteristics or other definitional aspects of that product to associate the created node with one or more nodes representing the class or sub class to which the financial product belongs, etc. Thus, the unified ontology is updated with a node representing the financial product and relationships relating that financial product to the financial institutions offering it, along with associating node representing that financial product with the classes or subclasses defining a type or sub type of that financial product. The FI administrator interface 852 may also allow the administrator or other user to submit or store content associated with recommending the added product (e.g., a .jpg or banner advertisement, a video, text, etc.). This content may be stored in a database accessible by presence system 800 or in a database accessible by online banking application 850.

The FI administrator interface 852 may also allow the administrator or other user at the FI to create, actuate or disable campaigns related to specific products in the ontology. A campaign may be comprised of recommendations, style, content, an audience specification, and an FI product. In creating a campaign, an FI administrator may select a product or an experience to be recommended, for example, by a real time recommendation interface of online banking application 850. The FI administrator may define an audience comprising a group of users for promoting the product or experience using the campaign. The FI administrator may choose one or more traits to define the audience. The FI administrator may also choose how much influence the traits have in the recommendation process. If no traits are selected or the FI administrator chooses zero influence for all of the chosen traits, then the system will automatically determine the best candidates (e.g., via ensemble learning process). If the FI administrator chooses a great level of influence, then the recommendations can be tailored with no regard to the ensemble recommendation process ("directed campaign"). There may also be a hybrid solution between these extremes where the system will weight the traits in the ensemble recommendation process. The campaign may then be stored in campaign data store 895.

FI administrator interface 852 may be connected to audiences component 856, traits component 858, and report component 860 via a web service interface 854. Audiences component 856 exposes an interface to the FI administrator and can be used for ad hoc querying across a population of users. In one embodiment, audiences component 856 can be an API provided by a REFTful interface. Audiences component 856 may be used in defining a hybrid campaign. For example, the FI administrator may want to use the automatically generated recommendations but choose to only target users above a certain credit score. Audiences component 856 may be connected to query interface 862 (which may use an http REST protocol) and query interface 862 may in turn be connected to a query data store 864 for analysis and querying. In one embodiment, query data store 864 may be a Spark SQL database. In another embodiment, query data store 864 may be a Postgres database.

Audiences component 856 may be used to analyze groups of users and may be used for both the definition of a group of users and measuring attributes of the group of users (e.g., the number of users in a group). In operation, if an FI administrator desires to target an audience for an FI product using the automatically generated recommendations (e.g., ordered lists) but only for users above a certain credit score, audiences component 856 may accept a query from the FI administrator. Audiences component 856 may then return an integer count that represents the number of users that satisfy the selected conditions to the FI administrator Interface 852. This information may be useful to the FI administrator in defining a campaign. The FI administrator may want to know how many users will be targeted in a campaign. The FI administrator may submit a query and, based on the number of users returned, may adjust the audience specification (e.g., to target more users).

Traits component 858 may provide an interface for scheduler 878, aggregator 866, web service interface 854, or FI administrator interface 852 to interact with traits keyspace 876. In one embodiment, traits component 858 can be an API provided by a REFTful interface.

Report component 860 may be used to retrieve a report for a campaign which can be presented to an FI administrator at FI administrator interface 852. For example, report component 860 can be used to report how many users have seen an impression or how many users have clicked on an impression. In one embodiment, report component 860 can be an API provided by a REFTful interface. Reports may be generated by reporting process 890. Reports and other associated data may be stored in reporting keyspace 888.

The aggregator 866 may form ordered lists for FI products in a campaign created by an FI administrator. In order to reduce wasted computation effort, aggregator 866 may ignore FI products which have not been specified in a campaign or for campaigns which are not active. Thus, aggregator 866 may only form ordered lists for active campaigns. Aggregator 866 may run at specified intervals (e.g., nightly) or on command to generate ordered lists. The generation of ordered lists may be performed offline and the ordered lists stored for use at runtime. In this manner, the computations need not be performed at runtime, increasing the performance of the recommendations.

Aggregator 866 retrieves a list of active campaigns for each FI by sending a request to campaign interface 894. The list of active campaigns may be retrieved from campaign data store 895 or from FI administrator interface 852. Campaign interface 894 may be an application programming interface. In one embodiment, query data store 864 stores a copy of the data from traits keyspace 876. This may be done for performance reasons (e.g., query data store is faster to access than system data store 872. Aggregator 866 may receive traits data from either traits keyspace 876 or query data store 864 via audiences component 856 and query interface 862. Retrieval may happen at specified intervals (e.g., nightly). The request may comprise a request for a list of campaigns for a specified FI. FI administrator interface 852 may respond to the request with a list of the active campaigns.

Aggregator 866 may then analyze the details associated with the campaign as part of its iterative process. Aggregator 866 then uses those details and accesses the audiences component 856 for the set of users for that FI that exhibit the one or more traits specified in the campaign. Thus, the system has campaigns for the FI and based on the traits associated with each campaign, it obtains a list of users that has those set of traits. Thus, the system has (for each campaign) a set of users for that FI that exhibit that set of traits defined in the campaign.

Aggregator 866 may then create an association between the user and the campaigns and store the association of users and campaigns into aggregator keyspace 882. The association maps users with a list of campaigns as an ordered list in order of decreasing relevance. Thus, aggregator keyspace 882 may store all of the campaigns for each financial institution. Associated with each campaign is a set of users that exhibit the trait(s) specified by that campaign. Additionally, the cache 880 is populated by the aggregator 866 with the same data as the aggregator keyspace 882. Cache 880 may be faster to access than aggregator keyspace 882 thus resulting in faster display of recommendations to a user device. The data in aggregator keyspace 882 and cache 880 may be static until aggregator 866 runs again and updates the associations.

In conjunction with the presentation of an interface for a particular FI then, the online banking application 850 may present one or more recommendations for a product of that FI to the user. In certain embodiments, one or more interfaces provided by the online banking application 850 may include a place for content concerning such a recommendation. Specifically, a user at a user device may access an interface for a particular financial institution through online banking application 850. Online banking application 852 may determine that a recommendation is needed (such as when a user logs into online banking application 850), online banking application 850 may send a request to recommender 896. The request may include an identification of the user and a request for active campaigns for that user. Recommender 896 (which may use an http REST protocol) accesses cache 880 and retrieves the active campaigns for the user. The active campaigns retrieved are then returned to online banking application 850 for presentation to the user. Online banking application 850 may select one or more FI products to display. For example, online banking application 850 may select the top one, top three, one of the top five, two of the top five, etc.

In one embodiment, online banking application may retrieve content associated with the one or more selected FI products (e.g., text, graphics) for display to the user at the user device. In one embodiment, the content may be retrieved from a database (not shown) such as a database at the FI.

Retrieving the raw data, creating the ontology, forming the initial ordered lists, and creating the associations may all be performed offline so that when a recommendation is needed, the system need not perform these processes. Accordingly, at runtime the system need only retrieve the associations for the user and return the associations to the online banking application. By performing these offline, the time required for the system to return a recommendation in response to a request by the online banking application 850 may be significantly reduced. It will be noted with respect to FIG. 8 that while certain components, types of communications or calls, locations of components or processes, etc. are illustrated in conjunction with the depicted embodiments, other embodiments may equally effectively utilize fewer or additional components, different locations for components or processes, different types of calls or communications, etc.

Turning now to FIG. 9, one embodiment of a data collection and ontology updating process that may be utilized by an online presence system is depicted. A presence system may receive FI product information from an FI administrator at a FI administrator interface (step 910). For example, an FI administrator may define products offered by the financial institution, including, providing a type, class (category) or subclass (subcategory), defining characteristics, a name, etc. associated with products offered by that institution. The FI product information may be received by a web service interface of the system.

The system may also collect data from a plurality of financial institutions (step 920), for example, by one or more micro aggregators. The one or more micro aggregators may collect data at specified intervals (e.g., nightly) and store the data as raw data in a fundamentals keyspace on a system data store. The data may include data on users, such as which users own which products, how many products each user owns, transactional behavior of the users, user online banking session data, click-through or other impression data, or other behavioral data.

The system may create or update an ontology using the FI product information and data collected (step 930). For example, the system may create new nodes for new financial institution products or may associate new user data with an existing financial institution product. Thus, the ontology may contain user data for a plurality of users across a plurality of financial institutions and financial institution product information for the financial institutions.

FIG. 10 depicts one embodiment of a scoring process that may be implemented by an online presence system. In this embodiment, the ontology may be referenced to generate a relevance score for a set of FI products for one or more users (step 1010). For example, an aggregator may retrieve data from the ontology and generate a score for each financial institution product using a collaborative filtering process. Based on the relevance score, the system may generate an ordered list of FI products in order of decreasing relevance for the set of FI products for each user (step 1020). The ordered lists may be generated at specified intervals (e.g., nightly) for each financial institution that each user interacts with via an online banking application associated with the system. The ordered lists may be stored in a traits keyspace of the system.

The system may receive a campaign definition from an FI administrator at a FI administrator interface (step 1030). For example, an FI administrator may specify a financial institution product that he wants to promote and one or more user traits to refine the users to be included in the campaign. The campaign definition may be stored in a campaign data store accessed by a campaign interface.

Additionally, the system may determine a set of users who match the campaign definition (step 1040) and associate each user of the set of users with that campaign (step 1050). For example, the aggregator may retrieve the campaign definition and the ontology data from the locations where they are stored. The associations between the users and the campaigns may then be stored in a database, such as by storing an ordered list of campaigns for each user (step 1060). The aggregator may store the associations in an aggregator keyspace of the system data store and may also store a copy of the data in a cache for faster access at runtime.

Turning now to FIG. 11, one embodiment of a method of a recommendation process that may be utilized by an online presence system is depicted. Here, a recommender of the presence system may receive a request for campaigns from an online banking application operating on a user device (step 1110). The request may be generated, for example, in response to the user logging into the online banking application and include an identification of the user. The recommender may retrieve campaigns associated with that user (e.g., from the cache) (step 1120) and return the list of active campaigns to the online banking application (step 1130). The online banking application may select one or more FI products from the list of campaigns provided for recommending to the user (step 1140). Content for the selected one or more products may be retrieved by the online banking application (step 1150). The content may be retrieved from a data store at the financial institution, from a data store in the presence system, or a third party data store. The content may include graphics or text which may be displayed to the user on the user device (step 1160).

As discussed, scoring may be accomplished in one embodiment by employing collaborative filtering (CF) techniques over a multi-dimensional space consisting of implicit ratings of elements (e.g., element of a Product Ontology as enclosed in Appendix A) given by users. Embodiments may admit a notable exception to the standard user-based CF approach which has not been previously utilized. Embodiments may model implicit ratings as a boolean value in the user-item matrix. That is, if user A has purchased, say, an auto loan and no other products at a financial institution, then user A's row in the user-item matrix will contain a "1" in the auto loan column, and a "0" in every other column.

To enhance the granularity and richness of the embodiments of a CF algorithm's notion of neighborhoods and user-to-user proximity, additional, abstract "item ratings"

may be folded directly into the user-item matrix alongside the traditional implicit ratings. These abstract ratings may be quite general in scope, but the unifying feature in embodiments is that they capture behavioral traits which are often not measurable by simply observing user-item interactions.

As an example, consider checking account usage solely in terms of credits and debits. A k-means clustering analysis might be deployed over a population of users which partitions the population into k distinct sets based upon credit and debit behavior. At this point, k would be defined with additional implicit "item ratings," each of which measures cluster membership respectively. Finally, this additional set of ratings is folded into the user-item matrix, making cluster membership available to the CF algorithms for neighborhood analysis and, eventually, product recommendation. Embodiments of a CF implementation as utilized may define the Spearman correlation coefficient as its distance metric.

As referenced above, in one embodiment users or financial product may be scored as follows (e.g., by a scoring process) by considering a set of users, U, and a set of items, I. Here, U comprises account holders at a financial institution (FI), and I comprises of financial service products offered by the FI. At any time, we may produce a list of recommended items from the set I, for a user in U.

We define a relevance index, which encodes a relationship between any member of U and any member of I. The relevance index is informed by an ensemble of techniques including, but not limited to user-based collaborative filtering, item-based collaborative filtering, model-based supervised machine learning, and hierarchical clustering analysis. This collection of techniques forms a set, T Given a user and an item, for each technique $t \epsilon T$, we may generate a score $s_t \epsilon (0,1)$, which is an indicator of that particular technique's measure of relevance between the user and item. So, given that a user and item have been chosen, the relevance index is formally defined as the weighted arithmetic mean depicted below.

$$\sum_{t \in T} w_t s_t$$

We impose the additional restriction that the collection of weights be normalized such that the sum of all values is 1. That is, $$\sum_{i=1}^{n} w_n = 1$$

Now, to generate an item recommendation for a user, we simply calculate the relevance index for each item in I, sort the resultant list of item-relevance index pairs in decreasing order of relevance, and choose items from the top of the list. Below is a more detailed treatment of some members of the technique set, T User-Based Collaborative Filtering This collaborative filtering (CF) implementation uses implicit, boolean ratings of items in I by users in U. Here, if a user has purchased an item, then that item has rating 1 for the user, otherwise the item has rating 0. With these ratings, we construct a metric space, M, with distance metric defined as the Spearman correlation coefficient, $\rho$. Here, $\rho$ is given as $$1 - \frac{6\sum_{i\in I} d_i^2}{n(n^2-1)}$$

where $d_i = a_i - b_i$ is the difference between the rating of an item Id by users a and b, with a, b$\in$U and n=|I|.

Now that we have a well-defined notion of distance over the space M, we may draw a bounding sphere of arbitrary radius r, about any user. Furthermore, if r is chosen to be sufficiently small, we may refer to users within any given bounding sphere as nearest neighbors.

Once a chosen user's set of nearest neighbors have been defined, we may identify the most popular items from the set I among those users, and sort those items in decreasing order of popularity. If the target user has already rated an item in the resultant list, then that item is removed. $s_t$ scores will decrease monotonically as the ordered list is traversed from the top down. Items near the top of the list will have an $s_t$ score near 1, and items near the bottom of the list will have an $s_t$ score near 0.

Item-Based Collaborative Filtering

Consider two items p, q$\in$I. We define a similarity metric, sim(p,q) as follows.

$$sim(p, q) = \frac{\sum_{u\in U}(R_{u,p} - \bar{R}_p)(R_{u,q} - \bar{R}_q)}{\sqrt{\sum_{u\in U}(R_{u,p} - \bar{R}_p)^2} - \sqrt{\sum_{u\in U}(R_{u,q} - \bar{R}_q)^2}}$$

Here, $R_{u,p}$ is the implicit rating of item p by user u. Additionally, $\underline{R}_q$ is the average rating, over all users, of item q. Thus, for a given item n$\in$I, we may calculate an $s_t$ score for our ensemble recommendation algorithm by simply taking the arithmetic mean across n's similarity measures to each item a user has purchased in the past. Formally, this is given as $$\frac{1}{|\hat{I}|}\sum_{m\in\hat{I}} sim(n, m)$$

for a given item, n, where $\hat{I}$ denotes the set of items in a user's purchase history.

Supervised Machine Learning

Another class of supplemental recommendation techniques employed within the ensemble framework comes from the field of supervised machine learning. These techniques include, but are not limited to the following example, which uses the Decision Tree algorithm to train a predictive classification model. First, we define several attributes, which may be observed and associated to user behavior.

weekend_login_density

This attribute measures the proportion of a user's total login events that occur on either Saturday or Sunday.

fixed_recurring_payment_density

This attribute measures the proportion of a user's total transactional activity that may be classified as fixed, recurring. A fixed, recurring transaction is one that has both a relatively fixed amount and a fixed temporal cycle over which it recurs.

is_commercial_customer

This attribute determines whether or not a user has self-identified as a commercial entity.

uses_commercial_payment_features

This attribute determines whether or not a user has historically engaged in any commercial payment activity, such as the authorization of ACH, payroll, or international wire transfer transactions.

has_commerical_loan

This is the target attribute. It determines if a user has previously purchased a commercial loan with the FI.

We now may define a machine learning example as a fixed-length attribute vector as follows $$\begin{pmatrix} \text{weekend\_login\_density} \\ \text{fixed\_recurring\_payment\_density} \\ \text{is\_commercial\_customer} \\ \text{uses\_comercial\_payment\_features} \\ \text{has\_commercial\_loan} \end{pmatrix}$$

where has_commercial_loan is the target attribute that we are attempting to predict.

Our Decision Tree implementation utilizes the Information Gain heuristic H(X) as the branching metric. H(X) is defined as follows. Consider a discrete random variable X, which can take one of m possible values from the set $\{x_1, x_2, \ldots, x_m\}$, with probability mass function, P(X). The Information Gain, H(X), then, is defined as $$-\sum_{i=1}^{m} P(x_i)\log_2 P(x_i)$$

Now, we may use the Decision Tree algorithm to train a predictive classification model, using the described machine learning examples gathered from a population of users. This model will predict the probability with which a chosen user is a good candidate for recommendation of a commercial loan product.

Clustering

Hierarchical Clustering Analysis (HCA) is an example of another technique employed within the ensemble recommendation framework. This analysis begins with a classification exercise across the entirety of each user's transactional history. Each user-initiated monetary transaction may be classified as belonging to one of the following categories.

Fixed Recurring

These transactions admit both a relatively fixed dollar amount, along with a fixed temporal cycle over which they recur.

Fixed Infrequent

These transactions admit only a fixed dollar amount. There is no discernable pattern of recurrence.

Single

These transactions admit no fixed dollar amount or discernable pattern of recurrence.

Each of these categories may apply to either a debit or credit transaction. Given this categorization structure we may, for each user, calculate the sum dollar amount total of activity within each category for both credits and debits over time. Additionally, we may calculate the integer count of transactions within each category for both debits and credits over time. Formally, we may define the following 12 variables.

sum_fixed_recurring_credit

The sum of dollar amount values for all credit transactions classified as fixed recurring.

sum_fixed_recurring_debit

The sum of dollar amount values for all debit transactions classified as fixed recurring.

count_fixed_recurring_credit

The integer count of all credit transactions classified as fixed recurring.

count_fixed_recurring_debit

The integer count of all debit transactions classified as fixed recurring.

sum_fixed_infrequent_credit

The sum of dollar amount values for all credit transactions classified as fixed infrequent.

sum_fixed_infrequent_debit

The sum of dollar amount values for all debit transactions classified as fixed infrequent.

count_fixed_infrequent_credit

The integer count of all credit transactions classified as fixed infrequent.

count_fixed_infrequent_debit

The integer count of all debit transactions classified as fixed infrequent.

sum_single_credit

The sum of dollar amount values for all credit transactions classified as single.

sum_single_debit

The sum of dollar amount values for all debit transactions classified as single.

count_single_credit

The integer count of all credit transactions classified as single.

count_single_debit

The integer count of all debit transactions classified as single.

Using these variables, we may define a 12-dimensional metric space, where each user at an FI occupies a single point in that space. The chosen metric is Euclidean distance. Formally, we model each user u at an FI as a 12-dimensional vector in this metric space as follows $$u = \begin{pmatrix} \text{sum\_fixed\_recurring\_credit} \\ \text{sum\_fixed\_recurring\_debit} \\ \text{count\_fixed\_recurring\_credit} \\ \text{count\_fixed\_recurring\_debit} \\ \text{sum\_fixed\_infrequent\_credit} \\ \text{sum\_fixed\_infrequent\_debit} \\ \text{count\_fixed\_infrequent\_credit} \\ \text{count\_fixed\_infrequent\_debit} \\ \text{sum\_single\_credit} \\ \text{sum\_single\_debit} \\ \text{count\_single\_credit} \\ \text{count\_single\_debit} \end{pmatrix}$$

Using the k-means clustering algorithm, we partition the population of users at an FI into k distinct clusters with similar users occupying the same cluster. Specifically, the k-means clustering algorithm endeavors to partition the population of users at an FI into k disjoint sets $U=\{U_1, U_2, \ldots, U_k\}$ such that the following objective function is minimized.

$$\min_U \sum_{i=1}^{k} \sum_{u \in U_i} \|u - \mu_i\|^2$$

Here, $\mu_i$ is the centroid of cluster $U_i$. Finally, we are able to assign each user at an FI to one of k clusters.

In a manner analogous to the user-based collaborative filtering case, we may now identify the most popular items from the set I for each cluster and sort those items in decreasing order of popularity. If the target user has already rated an item in the resultant list, then that item is removed. $s_t$ scores will decrease monotonically as the ordered list is traversed from the top down. Items near the top of the list will have an $s_t$ score near 1, and items near the bottom of the list will have an $s_t$ score near 0.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:

an online system communicatively connected to a plurality of financial institutions over a network, the online system comprising a processor and at least one non-transitory computer readable medium storing instructions executable on the processor for:

creating an ontology from data received from the plurality of financial institutions, wherein the data comprises:

user data, financial institution data, and financial institution product data;

wherein the ontology comprises:

a user ontology representing users across the plurality of financial institutions and behavioral data for the users;

a financial institution ontology representing the plurality of financial institutions; and a financial institution product ontology representing classes of financial institution products and specific products of the financial institutions, wherein the financial institution product ontology comprises a graph of nodes and relationships, the graph of nodes comprising:

a plurality of classification nodes representing classes and subclasses of financial institution products, and a plurality of product nodes representing specific products of the financial institutions, wherein each product node is associated with at least one classification node to thereby equate different financial products from disparate financial institutions having dissimilar names;

generating a relevance score for each financial institution product of a set financial institution products for each financial institution associated with each user, thereby forming a set of relevance scores associated with each user, wherein each relevance score of the set of relevance scores is generated using the ontology;

sorting the set of financial institution products for each user based on the set of relevance scores;

receiving a campaign definition for a financial institution, the campaign definition including a set of traits;

associating, based on the campaign definition and the relevance scores, a set of users with the campaign;

storing campaign associations relating to the set of users and the campaign, wherein the campaign associations are stored in a cache;

receiving a request for a first user;

determining the campaign associated with the first user using a campaign association from the cache to speed access to the campaign associated with the first user;

selecting one or more financial products for the campaign to be recommended to the first user based on a first set of financial institution products associated with the first user.

2. The system of claim 1, wherein the set of traits comprises an average daily balance for each user.

3. The system of claim 1, wherein each relevance score indicates a likelihood of the corresponding user purchasing a corresponding financial product.

4. The system of claim 1, wherein generating the relevance score for each financial institution product of a set financial institution products for each financial institution associated with each user comprises a user based collaborative filtering technique.

5. The system of claim 1, wherein the campaign comprises an audience specification and an FI product.

6. The system of claim 1, further comprising:

transmitting the selected one or more financial products for the campaign to the user device as one or more recommendations for a corresponding financial product, wherein the selected one or more financial products comprises a top financial product with the highest relevance score.

7. The system of claim 1, further comprising weighting each trait of the set of traits.

8. A method, comprising:

at an online system communicatively connected to a plurality of financial institutions over a network:

creating an ontology from data received from the plurality of financial institutions, wherein the data comprises:

user data, financial institution data, and financial institution product data;

wherein the ontology comprises:

a user ontology representing users across the plurality of financial institutions and behavioral data for the users;

a financial institution ontology representing the plurality of financial institutions; and a financial institution product ontology representing classes of financial institution products and specific products of the financial institutions, wherein the financial institution product ontology comprises a graph of nodes and relationships, the graph of nodes comprising:

a plurality of classification nodes representing classes and subclasses of financial institution products, and a plurality of product nodes representing specific products of the financial institutions, wherein each product node is associated with at least one classification node to thereby equate different financial products from disparate financial institutions having dissimilar names;

generating a relevance score for each financial institution product of a set financial institution products for each financial institution associated with each user, thereby forming a set of relevance scores associated with each user, wherein each relevance score of the set of relevance scores is generated using the ontology;

sorting the set of financial institution products for each user based on the set of relevance scores;

receiving a campaign definition for a financial institution, the campaign definition including a set of traits;

associating, based on the campaign definition and the relevance scores, a set of users with the campaign;

storing campaign associations relating to the set of users and the campaign, wherein the campaign associations are stored in a cache;

receiving a request for a first user;

determining the campaign associated with the first user using a campaign association from the cache to speed access to the campaign associated with the first user;

selecting one or more financial products for the campaign to be recommended to the first user based on a first set of financial institution products associated with the first user.

9. The method of claim 8, wherein the set of traits comprises an average daily balance for each user.

10. The method of claim 8, wherein each relevance score indicates a likelihood of the corresponding user purchasing a corresponding financial product.

11. The method of claim 8, wherein generating the relevance score for each financial institution product of a set financial institution products for each financial institution associated with each user comprises a user based collaborative filtering technique.

12. The method of claim 8, wherein the campaign comprises an audience specification and an FI product.

13. The method of claim 8, further comprising:

transmitting the selected one or more financial products for the campaign to the user device as one or more recommendations for a corresponding financial product, wherein the selected one or more financial products comprises a top financial product with the highest relevance score.

14. The method of claim 8, further comprising weighting each trait of the set of traits.

15. A non-transitory computer readable medium, comprising instructions for execution at an online system communicatively connected to a plurality of financial institutions over a network, the instructions executable for:

creating an ontology from data received from the plurality of financial institutions, wherein the data comprises:
   user data,
   financial institution data, and
   financial institution product data;
wherein the ontology comprises:
   a user ontology representing users across the plurality of financial institutions and behavioral data for the users;
   a financial institution ontology representing the plurality of financial institutions; and
   a financial institution product ontology representing classes of financial institution products and specific products of the financial institutions, wherein the financial institution product ontology comprises a graph of nodes and relationships, the graph of nodes comprising:
      a plurality of classification nodes representing classes and subclasses of financial institution products, and a plurality of product nodes representing specific products of the financial institutions, wherein each product node is associated with at least one classification node to thereby equate different financial products from disparate financial institutions having dissimilar names;
   generating a relevance score for each financial institution product of a set financial institution products for each financial institution associated with each user, thereby forming a set of relevance scores associated with each user, wherein each relevance score of the set of relevance scores is generated using the ontology;
   sorting the set of financial institution products for each user based on the set of relevance scores;
   receiving a campaign definition for a financial institution, the campaign definition including a set of traits;
   associating, based on the campaign definition and the relevance scores, a set of users with the campaign;

storing campaign associations relating to the set of users and the campaign, wherein the campaign associations are stored in a cache;
   receiving a request for a first user;
   determining the campaign associated with the first user using a campaign association from the cache to speed access to the campaign associated with the first user;
   selecting one or more financial products for the campaign to be recommended to the first user based on a first set of financial institution products associated with the first user.

16. The non-transitory computer readable medium of claim 15, wherein the set of traits comprises an average daily balance for each user.

17. The non-transitory computer readable medium of claim 15, wherein each relevance score indicates a likelihood of the corresponding user purchasing a corresponding financial product.

18. The non-transitory computer readable medium of claim 15, wherein generating the relevance score for each financial institution product of a set financial institution products for each financial institution associated with each user comprises a user based collaborative filtering technique.

19. The non-transitory computer readable medium of claim 15, wherein the campaign comprises an audience specification and an FI product.

20. The non-transitory computer readable medium of claim 13, further comprising:
   transmitting the selected one or more financial products for the campaign to the user device as one or more recommendations for a corresponding financial product, wherein the selected one or more financial products comprises a top financial product with the highest relevance score.

* * * * *